(12) United States Patent
Li

(10) Patent No.: US 12,346,303 B2
(45) Date of Patent: Jul. 1, 2025

(54) TRANSACTION PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Haixiang Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 170 days.

(21) Appl. No.: 18/070,758

(22) Filed: Nov. 29, 2022

(65) Prior Publication Data

US 2023/0100223 A1   Mar. 30, 2023

Related U.S. Application Data

(63) Continuation of application No. PCT/CN2022/073455, filed on Jan. 24, 2022.

(30) Foreign Application Priority Data

Jan. 28, 2021 (CN) .......................... 202110115847.4

(51) Int. Cl.
*G06F 16/23* (2019.01)
(52) U.S. Cl.
CPC ...... *G06F 16/2322* (2019.01); *G06F 16/2365* (2019.01)
(58) Field of Classification Search
CPC .......................... G06F 16/2322; G06F 16/2365
See application file for complete search history.

(56) References Cited

U.S. PATENT DOCUMENTS 10,983,981 B1 * 4/2021 Sharma ............... G06F 16/2365
2006/0149698 A1 * 7/2006 Haselden ........... G06Q 10/0633
(Continued)

FOREIGN PATENT DOCUMENTS

CN   109977171 A   7/2019
CN   110196760 A   9/2019
(Continued)

OTHER PUBLICATIONS

Ardekani, "Ensuring consistency in partially replicated data stores", HAL open science, Nov. 24, 2014.*
(Continued)

*Primary Examiner* — Jensen Hu
(74) *Attorney, Agent, or Firm* — Crowell & Moring LLP

(57) ABSTRACT

This application discloses a transaction processing method and apparatus, a computer device, and a storage medium, and relates to the technical field of databases. The method includes: obtaining a read set and a write set of a target transaction in response to a read-write operation of the target transaction; determining a logical begin time and a logical end time of the target transaction in response to a validation instruction of the target transaction; updating the logical begin time based on the write set in response to the logical begin time and the logical end time conforming to a concurrent consistency level of the target transaction, to obtain an updated logical begin time; and committing the target transaction in response to the updated logical begin time being less than or equal to the logical end time.

14 Claims, 6 Drawing Sheets

(56) References Cited

U.S. PATENT DOCUMENTS

| | | | |
|---|---|---|---|
| 2014/0310253 A1 | 10/2014 | Meng et al. | |
| 2015/0143064 A1* | 5/2015 | Bhargava | G06F 11/1451 711/162 |
| 2016/0378819 A1* | 12/2016 | Bishop | G06F 16/22 707/703 |
| 2019/0266176 A1 | 8/2019 | Hsieh et al. | |
| 2020/0226011 A1* | 7/2020 | Ye | G06F 11/0793 |
| 2021/0081372 A1* | 3/2021 | Lee | G06F 9/4411 |

FOREIGN PATENT DOCUMENTS

| | | |
|---|---|---|
| CN | 111259071 A | 6/2020 |
| CN | 111338766 A | 6/2020 |
| CN | 111459920 A | 7/2020 |
| CN | 111597015 A | 8/2020 |
| CN | 111736964 A | 10/2020 |
| CN | 112463311 A | 3/2021 |

OTHER PUBLICATIONS

Extended European Search Report issued for EP 22745183.8 dated May 29, 2024 (6 pages).

Chaudhary et al. "Achieving starvation-freedom in multi-version transactional memory systems." Networked Systems: 7th International Conference, NETYS May 2019 (53 pages).

Office Action issued in related Japanese Application No. 2023-524479 dated Mar. 15, 2024 with English Translation. 4 pages.

Office Action with English Translation of Concise Explanation of Relevance for Chinese Patent Application No. 202110115847.4 dated Mar. 18, 2021, 11 pages.

International Search Report and Written Opinion with English Translation for International Patent Application No. PCT/CN2022/073455 dated Apr. 11, 2022, 12 pages.

Li, Qingxia, "An Improved Concurrency Control Strategy of Distributed Transaction Based on Timestamp Ordering", Journal of Dongguan University of Technology, vol. 20, No. 3, dated Jun. 30, 2013, Relevant pp. 58-63.

* cited by examiner

TRANSACTION PROCESSING METHOD AND APPARATUS, COMPUTER DEVICE, AND STORAGE MEDIUM

RELATED APPLICATION

This application is a continuation application of PCT Patent Application No. PCT/CN2022/073455, filed on Jan. 24, 2022, which claims priority to Chinese Patent Application No. 202110115847.4, filed on Jan. 28, 2021, each of which is incorporated herein by reference in its entirety.

FIELD OF THE TECHNOLOGY

This application relates to the technical field of databases, and in particular to a transaction processing method and apparatus, a computer device, and a storage medium.

BACKGROUND OF THE DISCLOSURE

A data processing technology needs transaction semantics and uses four characteristics of ACID of a relational database to ensure the transaction characteristics of a system, so as to meet the needs of electronic transactions. A is atomicity, C is consistency, I is isolation, and D is durability. That is, electronic transaction operations need these four characteristics to ensure the security and reliability of the transactions.

A distributed transaction processing technology also needs to meet the four characteristics of ACID of transactions. In order to meet the four characteristics of ACID, a data processing technology needs a variety of technologies for guarantee, of which the most important is the consistency and isolation of data. The consistency of data determines the correctness of the data, and the isolation determines the performance of a concurrent system. To realize transaction consistency, that is, to discover and solve the problem of whether a concurrent operation of transactions causes data exceptions on data items and how to eliminate the data exceptions, it mainly depends on four data exceptions and isolation levels, a concurrent access control technology in database transaction processing technologies and the like.

SUMMARY

Embodiments of this disclosure provide a transaction processing method and apparatus, a computer device, and a storage medium.

According to one aspect, a transaction processing method is provided, and the method includes:
  obtaining a read set and a write set of a target transaction in response to a read-write operation of the target transaction;
  determining a logical begin time and a logical end time of the target transaction in response to a validation instruction of the target transaction;
  updating the logical begin time based on the write set in response to that the logical begin time and the logical end time conform to a concurrent consistency level of the target transaction; and
  committing the target transaction in response to that an updated logical begin time is less than or equal to the logical end time.

According to one aspect, a transaction processing apparatus is provided, and the apparatus includes:
  an obtaining module, configured to obtain a read set and a write set of a target transaction in response to a read-write operation of the target transaction;
  a determining module, configured to determine a logical begin time and a logical end time of the target transaction in response to a validation instruction of the target transaction;
  an updating module, configured to update the logical begin time based on the write set in response to that the logical begin time and the logical end time conform to a concurrent consistency level of the target transaction; and
  a committing module, configured to commit the target transaction in response to that an updated logical begin time is less than or equal to the logical end time.

According to one aspect, a computer device is provided, including one or more processors and one or more memories, the one or more memories storing at least one computer program, the at least one computer program being loaded and executed by the one or more processors to implement the transaction processing method as described above in any of the possible implementations.

According to one aspect, a non-transitory storage medium is provided, storing at least one computer program, the at least one computer program being loaded and executed by a processor to implement the transaction processing method as described above in any of the possible implementations.

According to one aspect, a computer program product or a computer program is provided, the computer program product or the computer program including one or more program code, the one or more program code being stored in a non-transitory computer-readable storage medium. One or more processors of a computer device read the one or more program code from the non-transitory computer-readable storage medium, and the one or more processors execute the one or more program code, to cause the computer device to perform the transaction processing method as described above in any of the possible implementations

DESCRIPTION OF EMBODIMENTS

Figure 1:
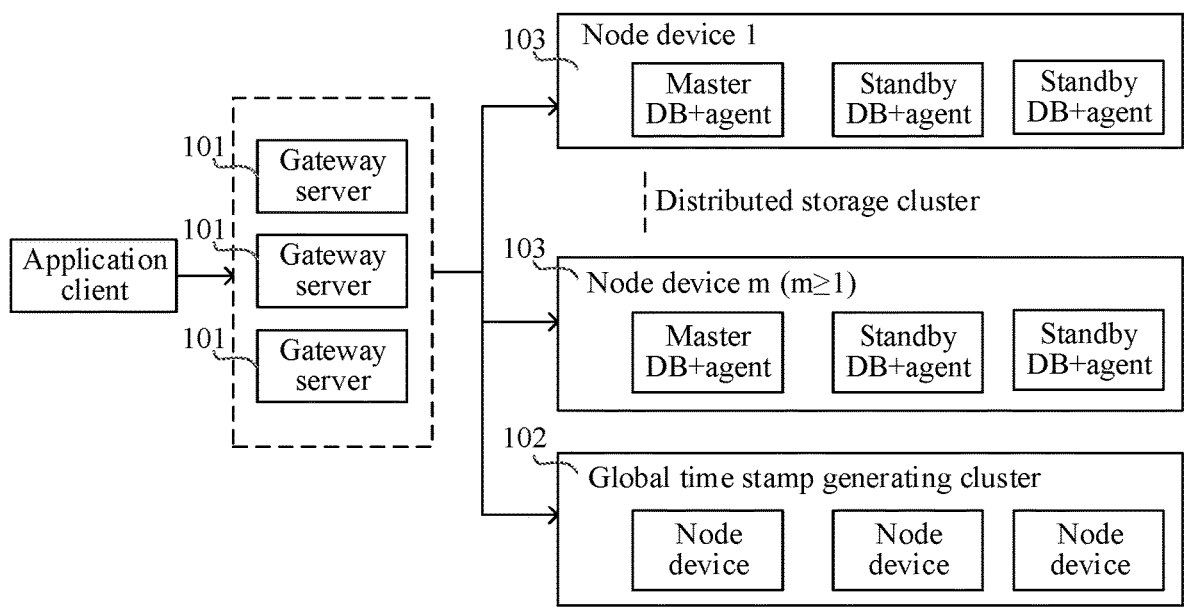
FIG. 1 is a schematic diagram of an exemplary implementation environment of a transaction processing method provided by an embodiment of this disclosure.

To make the objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. It is to be understood that, the "first", "second", and "nth" do not have a dependency relationship in logic or time sequence, and a quantity and an execution order thereof are not limited.

In this application, the term "at least one" refers to one or more, and the meaning of "plurality" refers to two or more. For example, a plurality of first positions refer to two or more first positions.

Before introducing embodiments of this disclosure, it is necessary to introduce some basic concepts in the field of cloud technology.

Cloud Technology: it refers to a hosting technology that unifies hardware, software, network and other series of resources in a wide area network or a local area network to realize data calculation, data storage, data processing and data sharing, it is also the general term of network technology, information technology, integration technology, management platform technology, application technology and the like applied based on a cloud computing business model, and it is used as needed and is flexible and convenient by forming a resource pool. A cloud computing technology becomes an important support of the field of the cloud technology. A background service of a technical network system requires a large amount of computing and storage resources, such as a video website, an image website, or more portal websites. As the Internet industry is highly developed and applied, each article may have its own identifier in the future and needs to be transmitted to a background system for logical processing. Data at different levels is separately processed, and data in various industries requires strong system support, which can be implemented through cloud computing.

Cloud Storage: it is a new concept extended and developed from the concept of cloud computing, and a distributed cloud storage system (hereinafter referred to as a storage system) refers to a storage system that gathers a large number of different types of storage devices (the storage devices are also referred to as storage nodes) in the network through application software or application interfaces by means of functions such as clustering applications, grid technology and a distributed document storage system to work cooperatively to jointly provide data storage and business access functions to the outside.

Database: for short, it can be regarded as an electronic file cabinet—a place for storing electronic files, which supports users' operations of adding, inquiring, updating, deleting and the like on data in the files. The so-called "database" is a data set that is stored together in a certain manner, is capable of being shared with a plurality of users, has redundancy as small as possible and is independent from applications.

Full State of Data: Data items in a database system are divided into three states based on different state attributes: current state, transitional state, and historical state. The three states are collectively referred to as "a full state of data". Such data is referred to as full state data for short. Different state attributes in the full state data may be used for identifying states of data in a life cycle track thereof.

First, current state: data items of the newest (latest) version, i.e., data items in a current stage.

Second, historical state: It is a state of a data item in history, of which a value is an old value, but not a current value. Optionally, a plurality of historical-state data items correspond to the same primary key identifier, reflecting a state transition process of various data items having the primary key identifier. The data item in the historical state can be read only, but cannot be modified or deleted.

Third, transitional state: neither current-state data items nor historical-state data items, being in a process of transitioning from the current state to the historical state, and data in the transitional state also called half-life data.

Optionally, different data items have the same primary key (PK) identifier, at this time, the data items having the same primary key identifier constitute a full-state data set, and the data items in the full-state data set are used for representing full-state data in essence, that is, in a process of modifying (or deleting) initial data items having the primary key identifier multiple times, a plurality of different versions generated due to different modifying (or deleting) moments constitute the full-state data set. In the full-state data set, some data items are in the current state, some data items are in the transitional state, and some data items are in the historical state. The full-state data set here refers to an abstract and virtual set concept, and the data items within the same full-state data set can be stored in different physical machines in a distributed manner. Optionally, in a case that the database system stores various data items, data items corresponding to the same primary key identifier are linked by using a pointer according to a time sequence, so that a life cycle trajectory of the full-state data can be inquired conveniently.

Visibility of data items: whether the data items are visible or not (visibility of the data items) for transactions, a certain data item may be visible for some transactions, and may be invisible for other transactions. In embodiments of this disclosure, a concurrent consistency level of a database system is provided, and different transaction concurrent control identification algorithms are provided for different concurrent consistency levels on that basis. The above algorithms will be described in detail below, and are omitted here.

The database system involved in the embodiments of this disclosure includes but is not limited to: a single-machine database system, a single-machine transaction-oriented database system, a single-machine analysis-oriented database system but needs transaction processing capability, such as non-relational SQL (NoSQL, generally referring to a non-relational database) system, or a distributed database system, a distributed big data processing system and the like.

At least one node device is included in the database system, a plurality of data tables are stored in a database of each node device, and each data table is used for storing one or more data items (also referred to as a variable version). The database of the node device is a distributed database of any type, including at least one of a relational database or a non-relational database, such as a structured query language (SQL) database, NoSQL, NewSQL (generally referring to various novel expandable/high-performance databases) and the like, and the type of the database is not specifically limited in the embodiments of this disclosure.

In some embodiments, the embodiments of this disclosure are applied to a database system based on a block chain technology (hereinafter referred to as a "block chain system"), the block chain system belongs to a decentralized distributed database system in essence, account data recorded in different node devices on a block chain is kept consistent by adopting a consensus algorithm, encrypted transmission and non-falsification of the account data among the different node devices are guaranteed through a cryptographic algorithm, an account function is extended through a script system, and the different node devices are connected with each other through network routing.

The blockchain system includes one or more blockchains, and the blockchain is a string of data blocks generated through association by using a cryptographic method. Each data block includes information of a batch of network transactions, the information being used for verifying the validity of information of the data block (anti-counterfeiting) and generating a next data block.

The node devices in the block chain system constitute a peer to peer (P2P) network, and a P2P protocol is an application layer protocol running on a transmission control protocol (TCP). In the block chain system, any of the node devices has the following functions: (A) Routing is a basic function of a node device and is used for supporting communication between the node devices. (B) An application is deployed in a blockchain, and is used for implementing a particular service according to an actual service requirement, recording data related to function implementation to form recorded data, adding a digital signature to the recorded data to indicate a source of data, and transmitting the recorded data to another node device in the blockchain system, so that the another node device adds the recorded data to a temporary block when successfully verifying a source and integrity of the recorded data, where the service implemented by this application includes a wallet, a shared recording, a smart contract, or the like. (C) Blockchain: including a series of blocks that are consecutive in a chronological order. Once a new block is added to the blockchain, the new block is no longer removed. The block records ledger data committed by a node device in the blockchain system.

In some embodiments, each block may include a hash value of a transaction record stored in the current block (a hash value of the current block) and a hash value of a previous block. Blocks are connected according to hash values to form a blockchain. Optionally, the block further includes information such as a timestamp indicating a block generation time.

Before the embodiments of this disclosure are introduced, since the degree of correctness of concurrent control over transactions in the database system is described through consistency and isolation, consistency and isolation are explained below.

I. Isolation

A transaction isolation level is defined by whether certain data exceptions can be avoided. The data exceptions that may be involved include: A. dirty read, which means that one transaction reads data items that have not been committed by another transaction; B. non-repeatable read, which means that a transaction reads the same data item twice but gets different results; and C. phantom read, which means that two predicate queries (range queries) are conducted by a transaction during the operation, and a result of the second query includes data items that do not appear in a result of the first query or lacks data items that appear in the result of the first query.

Based on the ability to solve the above three data exceptions, the international database standard American National Standards Institute (ANSI) SQL proposes four isolation levels to distinguish the above three known data exceptions, and the purpose is to improve the transaction processing efficiency while allowing some data exceptions to exist.

The four isolation levels include: a. read uncommitted: allowing the above three data exceptions; b. read committed: not allowing dirty read; c. repeatable read: not allowing dirty read and non-repeatable read; and d. serializability: allowing none of the above three data exceptions.

It can be seen that these four isolation levels do not allow dirty write exceptions. Dirty write exceptions mean that two uncommitted transactions modify the same data item. When ANSI SQL formulated the standard, there were not many known data exceptions, and new data data exceptions further include: loss update exception, read partial order exception, write partial order exception, read-write partial order exception, sawtooth wave write partial order exception, serial-concurrent-phenomenon exception, cross-phenomenon exception, causal loss exception, causal reversal exception, old read exception, future read exception and the like.

II. Consistency

In the database technology, the word "consistency" has two meanings, one is transaction consistency, and the other is distributed consistency.

The transaction consistency of a database is defined as: under the operation of a transaction, the data state of the database changes from one consistent state to another consistent state. The above "consistent state" refers to a data state that satisfies some rules predefined by the database system. For example, these rules include constraints, cascades, triggers, and any combination of the three (belonging to the logical semantics of data). The write partial order exception violates the constraints between specific data, and the constraints here belong to the consistency of data defined by user semantics.

The concurrent access control technology in the transaction processing technology of the database aims to discover and solve the problems of whether the concurrent operation of transactions causes data exceptions on the data items and how to eliminate the data exceptions. ANSI SQL proposes four data exceptions and isolation levels, and various concurrent access control algorithms have been developed, such as the concurrent access control technology based on lockout, the concurrent access control technology based on time stamps, the concurrent access control technology based on multi-version concurrency control (MVCC), and the concurrent access control technology based on optimistic concurrency control (OCC).

The distributed consistency of a database is defined as: the distributed consistency, also known as shared data object operation consistency, is a system level meaning for the entire database system, and means that to ensure the consistency of data in the database system, the database system is also required to meet two characteristics, one is serializability and the other is recoverability. Serializability refers to the serializability isolation level defined in isolation above. Serializability ensures that data will not be damaged by concurrent operations. Recoverability means that a committed transaction has not read data written by a rolled-back transaction (referring to that the dirty read exception will not occur). Recoverability ensures that data will return to the previous consistent state after a transaction is rolled back. The rolled-back transaction will not affect the data consistency, and the consistency state of the database system is recoverable.

Especially in a distributed database system (but not excluding an object-updated internal memory system and a distributed storage system and other systems with similar problems), an operation based on shared objects aims to solve the semantic problem of reading and writing ordering on data items between various operations in the distributed environment, such as involving various consistency models with different strength degrees, models with strong consistency such as linear consistency, sequential consistency and the like, and models with weak consistency such as atomic consistency, snapshot consistency, causal consistency and the like.

Both of the above two levels involve the concept of consistency, but they belong to different categories. The former, transaction consistency, refers to transaction-related consistency of how to avoid data exceptions discussed in the database category, while the latter, distributed consistency, refers to concurrent-operation- and non-concurrent-operation-related consistency of how to ensure semantic coherence between operations discussed in the concurrent operation category. In the distributed database system, these two levels of consistency meet and combine to achieve a unique combination dimension, which is called strict serializability (Strong-1SR).

The above two kinds of consistency are analyzed separately. At the transaction consistency level, the system is single, the semantics is strong, and the flexibility is not enough, the entire database system can only have one consistency level, and it is difficult to meet the actual business needs with different consistency requirements at the application level; and in addition, since such consistency requirement is very strict and the real-time mechanism of linearizability needs to be satisfied, the system has low concurrency and poor performance. At the level of distributed consistency, it separates the system between transaction consistency and distributed consistency, the association relation between the two cannot be established effectively, and in essence, still only the single combination dimension of strict serializability can establish the association relation; and in addition, a consistency model cannot effectively and comprehensively integrate transaction consistency and distributed consistency, so the theoretical system is incomplete and lacks practical value.

In the related art, realizing transaction consistency refers to discovering and solving the problems of whether the concurrent operation of transactions causes data exceptions on data items and how to eliminate the data exceptions. It mainly depends on the above four data exceptions and isolation levels, the concurrent access control technology in the database transaction processing technologies and the like, for example, the concurrent access control technology based on lockout, the concurrent access control technology based on time stamp ordering, the concurrent access control technology based on multi-version concurrency control (MVCC), the concurrent access control technology based on an operation control center (OCC) and the like. These technologies need to ensure that data exceptions do not occur, i.e., to meet serializability scheduling of transactions, so as to ensure the correctness of data.

The transaction consistency mentioned above refers to the transaction-related consistency of how to avoid data exceptions defined in the database category. The serializability technology and the multiple concurrent access control technologies in the database domain only solve the problems related to transaction consistency, and cannot solve other consistency problems (e.g., the problem of consistency of shared data objects), and thus some exception problems cannot be detected through the serializability technology. In other words, there are some transactions that meet the serializability requirement but still have exceptions, which cannot be detected by the serializability scheduling technology. In other words, the data exceptions under the transaction consistency and other consistency (e.g., the consistency of shared data objects) cannot be identified, and the accuracy of system state detection is low.

In view of this, the embodiments of this disclosure relate to a concurrent consistency model, which can establish a concurrent access control algorithm for multiple consistency levels, and can effectively ensure that user concurrent operations meet a variety of consistency semantics with different strength degrees in the aspect of data objects, so as to meet the requirements of different types of users for correctness and performance. In addition, a variety of consistency levels under a distributed system are systematically proposed, which can make the theoretical system complete, and implementation algorithms of various consistency levels as well as algorithm rules involved in decentralization for some levels are proposed correspondingly, and basic rules and implementation technologies for multiple consistency to coexist in the same system (i.e., different transactions in the same system have the same or different consistency levels) are also proposed, so that the important problem of multiple consistency levels under the distributed system are discussed, defined and specifically implemented. In other words, after the consistency is graded according to the strength degree, a time stamp ordering method is used for performing time stamp ordering detection on various consistency (i.e., determining whether a logical begin time and a logical end time meet the consistency level), which can avoid the time consumed by a detection ring (a dependency ring of transactions) in the related art and improve the transaction processing efficiency.

FIG. 1 is a schematic diagram of an implementation environment of a transaction processing method provided by an embodiment of this disclosure. Referring to FIG. 1, an embodiment of this disclosure is applicable to a distributed database system, the system includes a gateway server 101, a global time stamp generating cluster 102 and a distributed storage cluster 103, and the distributed storage cluster 103 includes data node devices and coordinating node devices.

The gateway server 101 is configured to receive an external read-write request and distribute read-write transactions corresponding to the read-write request to the distributed storage cluster 103. For example, after a user logs in an application client on a terminal, the application client is triggered to generate a read-write request, and an application programming interface (API) provided by the distributed database system is called to transmit the read-write request to the gateway server 101, for example, the API is a MySQL API (an API provided by a relational database system).

Optionally, the terminal may be a smartphone, a tablet computer, a notebook computer, a desktop computer, a smart speaker, a smartwatch, or the like, but is not limited thereto. The terminal and the gateway server 101 may be directly or indirectly connected through wired or wireless communication, which is not limited in this application.

In some embodiments, the gateway server 101 and any data node device or any coordinating node device in the distributed storage cluster 103 are combined into the same physical machine, that is, a certain data node device or coordinating node device is used as the gateway server 101.

The global time stamp generating cluster 102 is configured to generate a global time stamp of a global transaction, the global time stamp at least includes a logical begin time Bts and a logical end time Ets, and the global transaction is also referred to as a distributed transaction, meaning a transaction involving a plurality of data node devices, for example, a global read transaction involves read of data stored on the plurality of data node devices, and for another example, a global write transaction involves write of the data on the plurality of data node devices. The global time stamp generating cluster 102 is regarded as a single point logically, but in some embodiments, a service with higher availability is provided through an architecture of one master and three slaves, the global time stamp is generated by adopting the form of a cluster, and thus a single point fault can be prevented, and a single point bottleneck problem is avoided.

Optionally, the global time stamp is a globally unique and monotonically increasing time stamp identifier in the distributed database system, and is capable of marking a global committing order of each transaction to reflect a precedence relation of transactions in actual time (a total order of transactions), the global time stamp adopts at least one of a physical clock, a logical clock, a hybrid physical clock or a hybrid logical clock (HLC), and the type of the global time stamp is not specifically limited in the embodiment of this disclosure.

In an exemplary scene, the global time stamp includes a logical begin time Bts and a logical end time Ets of one transaction, the global time stamp is generated through the hybrid physical clock and is composed of eight bytes, where the first 44 bits are values of physical time stamps (i.e., Unix time stamps, accurate to millisecond, identifying a global system time, and represented by the symbol Gts), $2^{44}$ unsigned integers can be represented in total, and thus about $2^{44}/(1000*60*60*24*365)=557.8$ years of physical time stamps can be represented in total theoretically, where the last 20 bits are monotonically increasing counts within a certain millisecond, so each millisecond has $2^{20}$ (about 1 million, identifying relative time of a single node on a global time point, and represented by the symbol Lts) counts, based on the above data structure, in a case that the transaction throughput of a single machine (any data node device) is 10 w/s, the distributed storage cluster 103 containing ten thousands node devices is supported theoretically, meanwhile, the number of the global time stamps represents a total transaction number supported by a system theoretically, and based on the above data structure, $(2^{44}-1)*2^{20}$ transactions are supported by the system theoretically.

Here is merely an exemplary description of a method for defining the global time stamp, and according to different business requirements, the number of bits of the global time stamp is extended to satisfy supporting to a higher number of nodes and a higher number of processed transactions, for example, according to actual needs, a logical begin time Bts and a logical end time Ets of a single transaction are composed of data of more than eight bytes, such as ten bytes, so that Lts is increased to handle the higher number of concurrent transactions, and the method for defining the global time stamp is not specifically limited in the embodiment of this disclosure.

In some embodiments, the global time stamp generating cluster 102 is physically independent, or, is combined with the gateway server 101 or the distributed storage cluster 103.

The distributed storage cluster 103 includes data node devices and coordinating node devices, each coordinating node device corresponds to at least one data node device, and the data node devices and the coordinating node devices are divided for different transactions. Taking a certain global transaction as an example, an initiating node of the global transaction is called a coordinating node device, other node devices involved in the global transaction are called data node devices, the number of the data node device or coordinating node device is one or more, and the number of the data node devices or coordinating node devices in the distributed storage cluster 103 is not specifically limited in the embodiment of this disclosure.

Optionally, a node-across transaction (global transaction) is supported by adopting an eXtended Architecture (XA, a distributed transaction specification of the X/Open organization)/two-phase commit (2PC) technology in the system, the atomicity and consistency of data during a node-across write operation are guaranteed, and at the moment, the coordinating node devices are used as coordinators in a 2PC algorithm, while the data node devices corresponding to the coordinating node devices are used as participants in the 2PC algorithm.

Optionally, each data node device or coordinating node device is a single-machine device, or adopts a host-standby structure (i.e., a one-host multi-standby cluster), as shown in FIG. 1, illustration is made by taking an example that the node device (data node device or coordinating node device) is a one-host two-standby cluster, and each node device includes one host and two standby machines. Optionally, each host or standby machine is correspondingly configured with an agent device, the agent devices are physically independent from the hosts or standby machines, or, the agent devices are used as agent modules on the hosts or standby machines. Taking a node device 1 as an example, the node device 1 includes one master database and an agent device (master database+agent, hereinafter referred to as master DB+agent) and further includes two standby databases and agent devices (standby database+agent, hereinafter referred to as standby DB+agent).

In an exemplary scene, a database instance set of hosts or standby machines corresponding to each node device is called a SET. For example, assuming that a certain node device is a single-machine device, the SET of the node device is merely a database instance of the single-machine device; assuming that a certain node device is a one-host two-standby cluster, the SET of the node device is a set of a host database instance and two standby machine database instances; and at the moment, the consistency between data of the host and copy data of the standby machines is guaranteed based on a strong synchronization technology of a cloud database. Optionally, each SET is subjected to linear expansion to meet the business handling requirement under a big data scene, for example, under a financial business scene, a global transaction typically refers to SET-across transfer.

FIG. 1 merely provides an architecture diagram of one type of distributed database system. The whole distributed database system can be regarded as a logical big table that is jointly maintained, data stored in this big table is scattered into various node devices in the distributed storage cluster 103 through a primary key, and data stored on each node device is independent from other node devices, so that horizontal partitioning of the node devices to the logical big table is achieved. Since various data tables in various databases can be stored in a distributed manner after being horizontally partitioned in the above system, such system is also regarded as an architecture having "sharding".

A transaction processing method provided by the embodiment of this disclosure is applicable to the above distributed system adopting the sharding architecture. For example, the distributed system is a distributed transaction type database system or distributed relational database system. In addition, the transaction processing method provided by the embodiment of this disclosure is also applicable to distributed systems of any other architecture or single-machine database systems. For the distributed system, the distributed transaction processing capability is required, and in order to improve the transaction processing efficiency to meet application requirements of different users in different scenes, rich and flexible concurrent consistency levels further need to be provided.

In some embodiments, the distributed database system formed by the gateway server 101, the global timestamp generation cluster 102, and the distributed storage cluster 103, is considered as a server that provides a data service to a user terminal. The server is an independent physical server, or a server cluster or a distributed database system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

Figure 2:
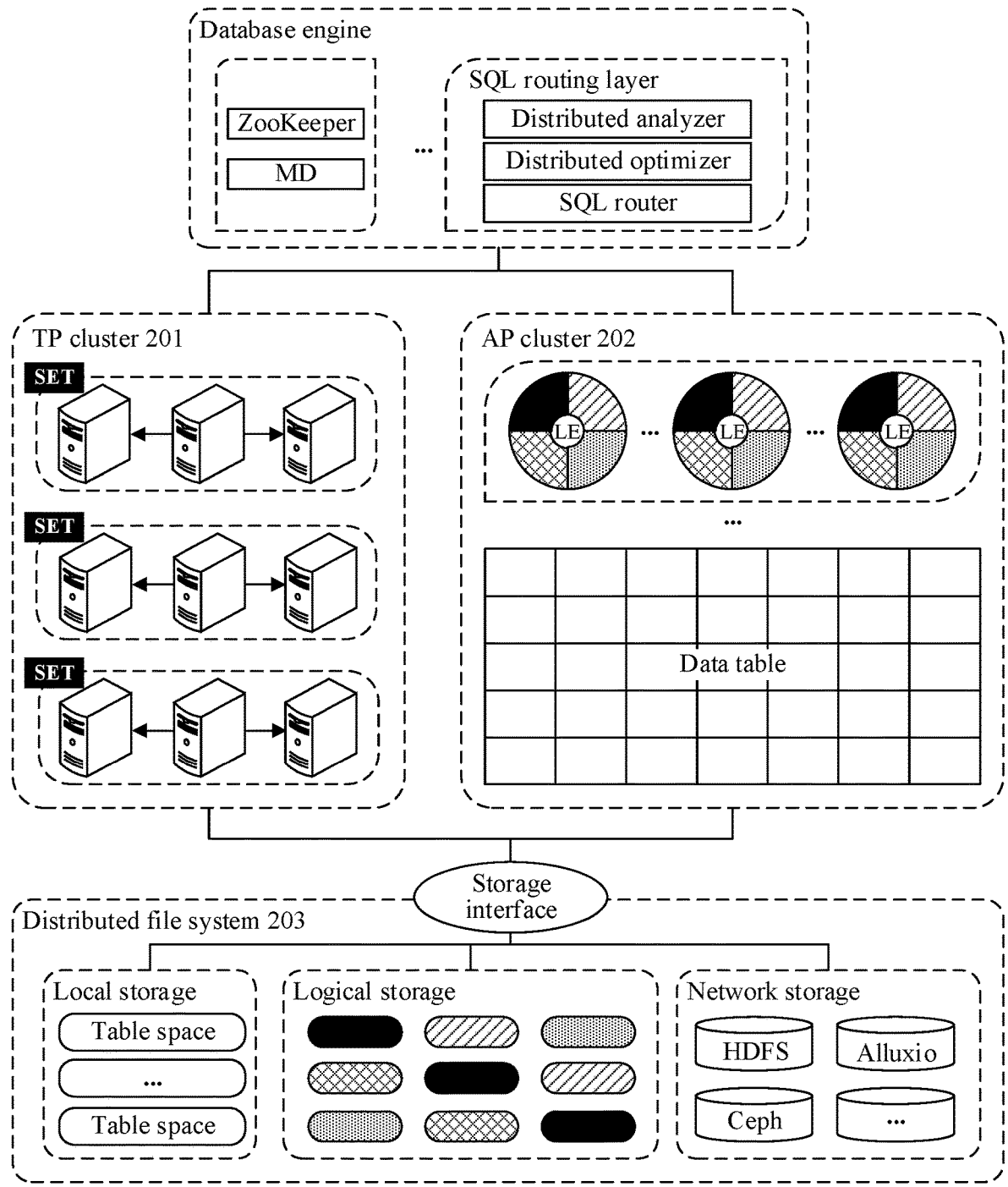
FIG. 2 is a schematic architectural diagram of an exemplary HTAC system provided by an embodiment of this disclosure.

In some embodiments, the above distributed database system is a hybrid transaction/analytical cluster (HTAC) system. FIG. 2 is a schematic architectural diagram of an HTAC system provided by an embodiment of this disclosure. Referring to FIG. 2, the HTAC system includes a transaction processing (TP) cluster 201 and an analytical processing (AP) cluster 202.

The TP cluster 201 is configured to provide transaction processing service. The TP cluster 201 includes a plurality of TP node devices, and during transaction processing, the TP node devices are configured to process current-state data. Each TP node device is a single-machine device or a one-host multi-standby cluster, and the type of the TP node devices is not specifically limited in the embodiment of this disclosure.

The AP cluster 202 is configured to store historical-state data and provide query and analysis service of the historical-state data. Optionally, the AP cluster 202 includes the global time stamp generating cluster 102 and the distributed storage cluster 103 in the above implementation environment. The distributed storage cluster 103 includes a plurality of AP node devices, each of the AP node devices is a single-machine device or a one-host multi-standby cluster, and the type of the AP node devices is not specifically limited in the embodiment of this disclosure.

In the above architecture, a database instance set of hosts or standby machines corresponding to each TP node device is called a SET. For example, in a case that a certain TP node device is a single-machine device, the SET of the TP node device is merely a database instance of the single-machine device; in a case that the TP node device is a one-host two-standby cluster, the SET of the TP node device is a set of a host database instance and two standby machine database instances; and at the moment, the consistency between data of the host and copy data of the standby machines is guaranteed based on a strong synchronization technology of a cloud database. Optionally, linear capacity expansion may be performed on each SET, to meet service processing requirements in the big data scenario.

Optionally, the AP node devices store historical-state data generated by the TP cluster 201 in a local database, or is connected into a distributed file system 203 through a storage interface, so that the distributed file system 203 provides an infinite storage function for the historical-state data generated by the TP cluster 201. The distributed file system 203 includes but is not limited to: Hadoop distributed file system (HDFS), Ceph (which is a distributed file system under a Linux system), and Alluxio (which is a memory-based distributed file system).

In some embodiments, since the plurality of TP node devices provide the transaction processing service, in a case that any transaction is committed, while new current-state data is generated, historical-state data corresponding to the current-state data will also be generated. Since the historical-state data will occupy much storage space but has storage value, the plurality of TP node devices migrate the generated historical-state data to the AP cluster 202 atomically through a predefined historical-state data migration policy, the AP node devices in the AP cluster 202 achieve dump of the historical-state data based on a local executor (LE) and register meta information of each data migration to a metadata (MD) manager, and thus the AP cluster 202 can count the meta information of stored data based on the MD manager conveniently.

In some embodiments, a user may perform routing query to find, based on a query statement, semantics of a query operation, and metadata that are provided in a structured query language router (SQL router (SR)) layer, any data stored in the TP cluster 201 or the AP cluster 202. The TP cluster 201 mainly provides query services for current state data, and the AP cluster 202 mainly provides query services for historical state data. Optionally, in the HTAC system, the gateway server 101 in the above embodiment is respectively arranged in front of the TP cluster 201 and the AP cluster 202.

The HTAC system above is an exemplary description of a distributed database system, also an exemplary description of a distributed transaction type database system, which requires distributed transaction processing capability and requires a consistency model on shared data. By applying the transaction processing method provided by the embodiment of this disclosure on the HTAC system, more-efficient recognition of more data exceptions can be achieved, and an efficient serializability isolation level can be achieved, so that the HTAC system can adapt to various business scenes. For example, in a case that a strict serializability level is used, the system can be better applicable to the financial field to guarantee the reliability of data, while current mainstream distributed database systems cannot efficiently provide such consistency level. For another example, in a case that a weak consistency level is used, the system can be well applicable to an Internet scene, so as to provide high-concurrent real-time database service, so that good product experience is provided for Internet users. In addition, more shared data consistency models which are more efficient can be further achieved, and under a distributed environment, various inconsistency problems such as causal loss, causal reversal, old read and future read can be avoided. Further, the system performance can be greatly improved on the basis of guaranteeing correctness, the reasons are that: (a) since multiple concurrent consistency levels are provided, different levels have different correctness and performance; (b) since concurrent access control algorithms under the corresponding levels are provided, on the basis of decentralization, a single-point performance bottleneck disappears; and (c) different concurrent access control algorithms have different implementations respectively, dedicating to efficiency construction algorithms, so that the algorithms are more efficient. Further, for a single-machine database system, the concurrent levels "sequential consistency" and "serializability" involved in the embodiment of this disclosure also have great benefits for optimization of the serializability theory (traditional serializability technologies give no consideration to the influence of a causal relation of a session on concurrent transactions). To sum up, this transaction processing method and related theories can effectively guarantee correctness of user data and accuracy of user application semantics, have better system performance, i.e., can improve the technical content of products, improve the technical threshold and competitiveness and technical influence, and have great practical significance.

Before introducing the embodiment of this disclosure, some basic terms and symbolic representations involved in the database system are introduced at first.

Transaction: a transaction is a logical unit in an operation execution process of a database management system, is composed of a finite database operation sequence, and is a minimum execution unit for database system operations. Within a system, the unit of each operation series is called a transaction, and a single operation is also called a transaction.

Variable: a transaction is a data unit in a database relation system, a variable is an actor (or an operation object) of a database operation, a variable contains a plurality of variable versions (hereinafter referred to as "version"), and every time a variable is updated by the transaction, a new variable version will be added. Optionally, various variable versions of the variable use natural numbers as version number identifiers, and the larger the version number, the newer the variable version.

Operation: a database operation is composed of three parts: an operation type, a transaction and a variable version. The operation type includes read (R) and write (W). For example, a variable x is updated by a transaction T, and a new version i of the variable x is generated, and the above read operation is recorded as $W_T(x_i)$. For another example, the transaction T reads a value of the version i of the variable x, and the above write operation is recorded as $R_T(x_i)$.

Transaction data set: a data set is a set composed of a plurality of variable versions, and each variable in the set at most contains one version, recorded as a data set $DS(T)=\{x_i, y_j, z_k, \ldots | x,y,z$ are variables, and $i,j,k$ are version numbers$\}$.

Each transaction in the database system has two transaction data sets, namely a write set of the transaction and a read set of the transaction respectively, meaning that: the write set $DS_W(T)$ is used for storing a new data version written by the transaction T, and the read set $DS_R(T)$ is used for storing a data version read by the transaction T.

Based on the above, there are two association relations among transactions, one is related transactions, and the other is non-related transactions. The related transactions further include: object life cycle overlapping related transactions and causal related transactions. The non-related transactions refer to other transactions that do not meet the definition of the related transactions.

The object life cycle overlapping related transactions refer to that two transactions need to operate a common data object and have overlapping time. The related transactions are subdivided into 2 types: first, direct concurrent transactions, referring to that execution time of transactions $T_1$ and $T_2$ has overlapping, and common data items are operated through a partial order relation; and second, indirect concurrent transactions, referring to that the transactions $T_1$ and $T_2$ are direct concurrent transactions, transactions $T_2$ and $T_3$ are direct concurrent transactions, but the transactions $T_1$ and $T_3$ do not meet one or both of 2 conditions of direct concurrent transactions, and then the transactions $T_1$ $T_3$ are indirect concurrent transactions.

The causal related transactions refer to that transactions do not overlap in execution time but occur in the same progress/session; or, for the same shared data object, the transaction $T_1$ conducts writing first, and the transaction $T_2$ reads a value written by $T_1$ later, so that a causal relation is included between the transactions $T_1$ and $T_2$; transactions meeting the 2 situations above are called the causal related transactions.

The non-related transactions refer to that the transactions $T_1$ and $T_2$ do not meet the 2 relations described above (object life cycle overlapping related transactions or causal related transactions), so they are non-related transactions to each other.

Since the concurrent consistency levels in the embodiment of this disclosure involve detecting whether a partial order relation is met, before the concurrent consistency levels are introduced, the partial order relation needs to be described. A partial order relation defined based on shared operation data items is divided into a concurrent partial order (CPO), a program order (PO) and a similar program order (SPO), which are described respectively below.

1. On the shared operation data items, the definition of the partial order relation within the range of concurrent transactions contains the following 4 concurrent partial order relations.

(1-1) RW partial order (read-write partial order relation): the transaction $T_1$ reads a version $x_0$ of a data item X, the transaction $T_2$ writes a version $x_1$ of the data item X, and then the transaction $T_1$ the transaction $T_2$ form a partial order relation, represented as $(T_1 \rightarrow T_2 | X)$.

(1-2) WR partial order (write-read partial order relation): the transaction $T_1$ writes the version $x_0$ of the data item X, the transaction $T_2$ reads the version $x_0$ of the data item X, and then the transaction $T_1$ the transaction $T_2$ form a partial order relation, represented as $(T_1 \rightarrow T_2 | X)$.

(1-3) WW partial order (concurrent write partial order relation): the transaction $T_1$ writes the version $x_0$ of the data item X, the transaction $T_2$ writes the version $x_1$ of the data item X, and then the transaction $T_1$ the transaction $T_2$ form a partial order relation, represented as $(T_1 \rightarrow T_2 | X)$.

(1-4) WRA partial order (inverse partial order relation): the transaction $T_1$ writes the version $x_0$ of the data item X, and the transaction $T_2$ reads the version $x_0$ of the data item X; then, the transaction $T_1$ is subjected to a rolling-back operation, thus the rolling-back operation generates a partial order relation of revocation to the read operation of the transaction $T_2$, the partial order relation is sent by the transaction $T_2$ towards the transaction $T_1$, and therefore an inverse partial order relation is formed between the transaction $T_1$ the transaction $T_2$, represented as $(T_2 \rightarrow T_1 | X)$.

2. On the shared operation data items, the definition of the partial order relation within the range of causal related transactions contains the following 3 program order relations.

(2-1) RCW partial order (no partial order relation): the transaction $T_1$ reads the data item X, then, before committing, the transaction $T_2$ writes the data item X, and because the former has no influence on the latter, no partial order relation is included between the transaction $T_1$ the transaction $T_2$.

(2-2) WCR partial order (causal write-read partial order relation): the transaction $T_1$ writes the data item X, and then, before committing, the transaction $T_2$ that reads the data item X appears. Because the transaction $T_2$ surely reads a value written by the previously committed transaction $T_1$, a causal relation is included between the transaction $T_1$ the transaction $T_2$, and the transaction $T_1$ is a reason, while the transaction $T_2$ is a result. In a case that the transaction $T_1$ and the transaction $T_2$ are in the same progress, it is determined that the transaction $T_1$ the transaction $T_2$ form a program order relation in one progress, represented as $(T_1 \rightarrow T_2 | X)$.

(2-3) WCW partial order (causal write partial order relation): the transaction $T_1$ writes the version $x_0$ of the data item X and is committed, then the transaction $T_2$ writes the version $x_1$ of the data item X, and the version is changed. In a case that the transaction $T_1$ the transaction $T_2$ are in the same progress, it is determined that the transaction $T_1$ the transaction $T_2$ form a program order relation in one progress, represented as $(T_1 \rightarrow T_2|X)$.

3. On the shared operation data items, the definition of the partial order relation within the range of similar causal related transactions contains the following 2 similar program order relations.

(3-1) similar causal write-read partial order relation: the transaction $T_1$ writes the data item X, and then, before committing, the transaction $T_2$ that reads the data item X appears. Because the transaction $T_2$ reads a value written by the previously committed transaction $T_1$, a causal relation is included between the transaction $T_1$ the transaction $T_2$, and the transaction $T_1$ is a reason, while the transaction $T_2$ is a result. In a case that the transaction $T_1$ the transaction $T_2$ are in different progresses, it is determined that the transaction $T_1$ the transaction $T_2$ form a program order relation in different progresses, represented as $(T_1 \rightarrow T_2|X)$.

(3-2) similar causal write partial order relation: the transaction $T_1$ writes the version $x_0$ of the data item X and is committed, then the transaction $T_2$ writes the version $x_1$ of the data item X, and the version is changed. In a case that the transaction $T_1$ the transaction $T_2$ are in the same progress, it is determined that the transaction $T_1$ the transaction $T_2$ form a program order relation in one progress, represented as $(T_1 \rightarrow T_2|X)$.

Based on the above concept description of isolation and consistency, the word, isolation level, comes from the concurrent access control technology of the database system, but the isolation level is only defined on the basis of limited data exception (e.g., three exceptions defined by the ANSI SQL standard) access, and lacks detection sensitivity to other various exceptions. The concurrent consistency level involved in the embodiment of this disclosure is called "concurrent level" for short.

Concurrent level: the behaviors of all types of transactions (direct concurrent transactions, indirect concurrent transactions, causal related transactions and non-related transactions) in databases on data items are subjected to level division, and from strong to weak, the following various different concurrent consistency levels are defined. The concurrent consistency levels are defined with transactions as units rather than with the system as the unit, that is, in the same database system, different transactions are allowed to meet different concurrent consistency levels.

Under the concurrent consistency levels, each transaction at least involves two global time stamps, one is a logical begin time Begin Time Stamp (Bts) of the transaction, and the other is a logical end time End Time Stamp (Ets) of the transaction. The Ets value of a rolled-back transaction is set as NULL. In addition, each session maintains one Newts to represent a time stamp value of a newest completed transaction occurring on the session, i.e., a newest completed transaction time stamp Newts, used for ensuring the partial order relation (sequential consistency). In the following, 9 concurrent consistency levels are defined.

1) Serialization Consistency: all transactions are serially queued for execution within a logical system. One or more executable nodes exist in the system, and are applicable to a single-machine system and a distributed system. A single processor and multiple processors can be supported in the single-machine system, the serialization consistency level is the strongest consistency level, and no data exception or inconsistency can occur.

2) Strict Serializability Consistency: namely, strict serializability. In all the transactions, write transactions are serially executed, but only read-only transactions and non-read-only transactions are allowed to be concurrently executed. For one read-only transaction, a "time travel" event is not allowed, in other words, the newest data is read from the current moment, and two inconsistency data exceptions of "old read and future read" are not allowed. The strict serializability consistency level does not allow two inconsistency data exceptions of "causal loss and causal reversal" either.

The time travel event above means that: a transaction $T_k$ crosses forwards Bts of at least one committed transaction to read old data (old version of data), which is called the time travel event; in a case that data is obtained without crossing Bts of any committed transaction, it is not the time travel event; and in a case that read data is a data version of the newest committed transaction and Bts of the transaction is earlier than Bts of this event, it is called an approximate time travel event.

The events above are defined to make transaction-based concurrent read move forwards Bts of a read-only transaction instead of reading a result of a write operation of the concurrent transaction, so that the concurrent transaction performs data reading with transactions as units.

3) Linearizability Serializability Consistency: namely, linear serializability. All transactions can be concurrently executed; but for the concurrently executed transactions, a read-write relation among the transactions needs to meet the real-time requirement, and needs to guarantee no any data exception. The real-time condition ensures that it is not possible that the three inconsistency data exceptions of "causal loss, causal reversal and old read" exist, but the inconsistency data exception of future read is allowed.

However, for the requirement of serializability consistency, an "appropriate time travel" operation is performed for the read operation of one transaction, that is, the newest data is read from the current moment (Bts of this transaction), so that "future read" cannot occur. In addition, under the requirement of serializability consistency, whether data exceptions exist needs to be detected.

Therefore, the linearizability serializability consistency level is similar to the strict serializability consistency level in the aspect of reading data, but the concurrency is slightly higher.

4) Sequential Serializability Consistency: namely, sequential serializability. In one session, a result value is stable, and old read cannot occur; and the concurrent transactions meet the requirement of serializability consistency.

5) Serializability Consistency: in one session, a result value is instable, and old read can occur; and the concurrent transactions meet the requirement of serializability consistency. Compared with the sequential serializability consistency level, at the serializability consistency level, the limitation of the partial order relation in the same session is omitted. This definition conforms to a traditional serializability consistency definition.

6) Causal Repeatable Read Consistency: repeatable read considering the causal relation. In one system, the causal relation is met, but the concurrent transactions are not required to meet serializability consistency, that is, data exceptions may exist, and various inconsistency data exceptions such as "causal loss, causal reversal, old read and future read" may also exist. However, data exceptions of write partial order and read-write partial order types are not allowed.

7) Repeatable Read Consistency: repeatable read not considering the causal relation. Data exceptions of write partial order and read-write partial order types are not allowed.

8) Read Committed Consistency: read committed not considering the causal relation. Data exceptions of read partial order and write partial order types are allowed.

9) Read Uncommitted Consistency: the weakest consistency level, where any data exception and inconsistency may occur.

Table 1 shows the relation among the above concurrent consistency levels to distinguish the differences and connections among the different concurrent levels more obviously. "Overlapping" means that the current concurrent level allows logical time intervals of two transactions to overlap, while "not overlapping" means that the current concurrent level does not allow logical time intervals of two transactions to overlap.

type, strong consistency level: serialization consistency, strict serializability consistency, linearizability serializability consistency and sequential serializability consistency; second type, intermediate level: serializability consistency, where this level only has global guarantee among concurrent transactions; third type, weak consistency level: causal repeatable read consistency, repeatable read consistency and read committed consistency; fourth type, zero consistency level: read uncommitted consistency, where this level has no consistency guarantee.

The transaction processing method involved in the embodiment of this disclosure is applicable to all concurrent levels, and concurrent level algorithms based on different strength degrees of clocks are introduced below. A global clock (i.e., global time stamp) is a logical concept, which provides a unified monotonically-increasing value for the whole database system. Optionally, the global clock is a global physical clock, or, the global clock is a global logical clock.

TABLE 1

| Concurrent level | Write-write | | Write-read | Read-read | Read after write (implicit requirement; non-concurrent operation, processing local |
|---|---|---|---|---|---|
| | Related data items | Non-related data items | (related data items) | (related data items) | partial order relation) |
| Serialization consistency | Not overlapping | Not overlapping | Not overlapping | Not overlapping | Read the newest |
| Strict serializability consistency | Not overlapping | Overlapping | Not overlapping | Allow overlapping | Read the newest |
| Linearizability serializability consistency | Not overlapping | Overlapping | Allow overlapping | Allow overlapping | Which value to read is not sure, but an obtained value is a value affected by a write operation (begin) before a read operation |
| Sequential serializability consistency | Not overlapping (ordered in session) | Overlapping | Allow overlapping | Allow overlapping | Which value to read is not sure, but values written for one session need to conform to a write sequence |
| Serializability consistency | Not overlapping (not ordered in session) | Overlapping | Allow overlapping | Allow overlapping | Which value to read is not sure, but values written for one session may not conform to a write sequence |
| Causal repeatable read consistency | Not overlapping | Overlapping | Allow overlapping | Allow overlapping | Reading according to a causal relation (not necessarily to be the newest, for example, reading with snapshots conforming to a causal relation) |

The 9 concurrent consistency levels are divided into 4 types from the perspective of the strength degree of consistency, the distinguishing perspective is whether global consistency maintaining capability is available, in response to being available, it belongs to a concurrent level with strong consistency, and in response to being not available, it belongs to a concurrent level with weak consistency. First In some embodiments, a distributed decentralized clock is constructed by using a Truetime mechanism, or, a host-standby system with a plurality of redundant nodes (e.g., clusters constructed through consistency protocols such as Paxos/Raft) is adopted for unified providing, or, the global clock is constructed based on an algorithm having an accurate synchronization mechanism with a node exit mechanism, and the construction manner of the global clock is not specifically limited in the embodiment of this disclosure.

During comparison of global clocks, assuming that there are two transactions $T_i$ and $T_j$, if $T_i.bts.gts<T_j.bts.gts$ OR ($T_i.bts.gts=T_j.bts.gts$ AND $T_i.bts.lts<T_j.bts.lts$), it is believed that: $T_i.bts<T_j.bts$. That is, taking an HLC clock as an example, it is composed of eight bytes, Bts includes the former part of Gts and the latter part of Lts, and during magnitude comparison of Bts of the two transactions, Gts is compared preferably, and Lts is compared in a case that Gts is the same.

After each transaction is successfully committed, an incremental operation needs to be performed on Lts on a coordinator (i.e., coordinating node device), Newts of each session is increased progressively, and thus causal order increasing of the system can be guaranteed.

In the following, on the basis of the definitions of the 9 concurrent levels above, 9 concurrent level algorithms based on clocks are introduced.

I) Serialization consistency: any 2 transactions $T_i$ and $T_j$ need to meet $T_i.ets<T_j.bts$, so that $T_i$ occurs and is completed prior to $T_j$. Values of Bts and Ets are obtained from the global clock.

II) Strict serializability consistency: any 2 concurrent write transactions $T_i$ and $T_j$ need to meet $T_i.ets<T_j.bts$, so that $T_i$ occurs and is completed prior to $T_j$. In a case that the transactions $T_i$ and $T_j$ are not concurrent transactions, they are not limited by $T_i.ets<T_j.bts$.

In addition, a read-only transaction $T_k$ and the uncompleted transaction $T_j$ can be concurrent, that is, $T_j.bts<T_k.bts$. In a case that $T_k$ and $T_j$ are concurrent transactions, data that is written by $T_i$ is read, instead of data that is written by $T_j$ but not completed yet (ensuring reading of newest data). Herein, an "approximate time travel" event occurs actually.

In addition, values of Bts and Ets of $T_i$ and $T_j$ are obtained from the global clock. In a case that $T_k$ is a distributed transaction, its Bts needs to be obtained from the global clock; and in a case that $T_k$ is a local transaction (single-node transaction), its Bts can be obtained from a clock on a node, but the node clock needs to be synchronously updated along with the global clock.

In addition, a read operation of one transaction cannot read values of data items that are committed prior to this transaction in the future, that is, if $T_i.bts<T_j.bts$, then $R_i(X)\neq W_j(X)$. That is, future read is not supported.

III) Linearizability serializability consistency: any 2 write transactions $T_i$ and $T_j$ do not need to meet $T_i.ets<T_j.bts$, but in a case that they are concurrent transactions, serializability consistency validation is required. This is the difference from the definition of the strict serializability consistency level. Other conditions for read-only transactions and a clock obtaining manner are the same as the strict serializability consistency level, and the linearizability serializability consistency level does not support future read either.

IV) Sequential serializability consistency: transactions of any type can be executed concurrently or parallelly. In a case that the transactions are concurrent transactions, serializability consistency validation is required.

In addition, for any two transactions from the same session, $P(T_i)=P(T_j)$, where $P(\ )$ represents a progress; and an Ets value of each transaction is definitely incremental, i.e., $T_i.ets<T_j.bts$.

In addition, Bts and Ets of a distributed transaction come from the global clock or a hybrical logical clock; and Bts and Ets of a local transaction may come from a clock on this node but need to reflect a causal relation between clocks, that is, in a case that two progresses $P_i$ and $P_j$ have a relation that $P_i$ is the reason and $P_j$ is the result, a clock of $P_j$ needs to be adjusted according to a clock of $P_i$, so that after adjustment, the clock of $P_j$ is to be greater than the clock of $P_i$.

In addition, the sequential serializability consistency level allows old read and future read, and allows causal loss and causal reversal.

In addition, it is equivalent that serializability consistency of the partial order relation is considered in the sequential serializability consistency level.

V) Serializability consistency: it is similar to the sequential serializability consistency level, but the influence of the partial order relation on serializability consistency is not considered. It is equivalent to a traditional serializability scheduling technology.

VI) Causal repeatable read consistency: for any two transactions $T_i$ and $T_j$ having a causal relation, in a case that two progresses $P_i$ and $P_j$ have a relation that $P_i$ is the reason and $P_j$ is the result, a clock of $P_j$ needs to be adjusted according to a clock of $P_i$, so that after adjustment, the clock of $P_j$ is to be greater than the clock of $P_i$. Whether a causal relation is included between $T_i$ and $T_j$ is determined according to the definitions of the PO relation, the CPO relation and the SPO relation above.

In addition, in response to that this transaction reads data, reading is performed with snapshots established by Bts of this transaction.

In addition, serializability consistency does not need to be validated in the causal repeatable read consistency level, but it needs to be guaranteed that there is no read partial order exception, and data exceptions of write partial order and read-write partial order types cannot be discovered.

VII) Repeatable read consistency: the causal relation is not considered, and others are similar to the causal repeatable read consistency level.

VIII) Read committed consistency: read committed not considering the causal relation. Future read is allowed, that is, for any 2 transactions, even if $T_i.bts<T_j.bts$, but if $T_j.ets<T_i.ets$, $T_i$ can read a data item $W_j(X)=R_i(X)$ written by $T_j$. This shows that the "Time Travel" event occurs.

In addition, data exceptions of read partial order and write partial order types are allowed.

IX) Read uncommitted consistency: the weakest consistency level, where any data exception and inconsistency may occur. There is no any limitation on the read uncommitted consistency level, data exceptions are not validated, and inconsistency limitation is not performed.

In a case that the concurrent level algorithms based on the clocks above are applicable to the distributed database system, and different nodes in the system need synchronous correction, the system adopts an algorithm similar to a network time protocol (NTP) for periodic time correction. In addition, in a case that causal events occur, time of a node where a reason event is located is used for correcting time for a node where a result event is located. In addition, assuming that a concurrent level of a certain transaction is higher than or equal to the serializability consistency level, in a case that the global time stamp is obtained, the obtained global time stamp is used for correcting time for a time stamp of a local node. In addition, for the node with corrected time, time correction at least requires a clock value of this node to keep an attribute of monotonical increasing.

In some embodiments, in the time correction process of two node devices, in a mutual communication message packet between the node devices, a newest time stamp message of the local node is passed to another message receiving party with time to be corrected, and after the message receiving party receives the information, in a case that a time stamp value of the message packet is greater than a time stamp value of a local clock, the local clock is modified.

In the following, the embodiment of this disclosure further provides a demonstration process for uniqueness of the linearizability serializability consistency level. In the industry, there are three types of linearizability serializability consistency levels: a linearizability level, a linearizability-regular level and a linearizability-safe level. Respective detailed definitions of the three types are as follows, and after transaction consistency is integrated, in the above three types of linearizability serializability consistency levels, only one level can exist.

The definition of the linearizability level is:

$$\text{Linearizability}(\mathcal{F}) \triangleq \text{SingleOrder} \wedge \text{RealTime} \wedge \text{RVal}(\mathcal{F})$$

where $$\text{SingleOrder} \triangleq \exists H' \subseteq \{ \text{op} \in H : \text{op.oval} = \nabla \} : \text{vis} = \text{ar} \backslash (H' \times H)$$

and $$\text{RealTime} \triangleq \text{rb} \subseteq \text{ar}$$

$\mathcal{F}$ represents a function for obtaining a return value of a read/write operation, SingleOrder represents a single global order, RealTime represents a real-time mechanism, RVal represents a return value meeting the consistency condition, H represents a series of historical operations, H' represents that one H exists, op represents a read/write operation of a current transaction, ar represents a total order of H, vis represents visibility of the read/write operation, rb represents a partial order relation of H, op.oval represents a return value of the read/write operation, and $\nabla$ represents a moment that the return value is obtained but has not been returned to a user yet.

The definitions of the linearizability-regular level and the linearizability-safe level are:

$$\text{Regular}(\mathcal{F}) \triangleq \text{SingleOrder} \wedge \text{RealTimeWrites} \wedge \text{RVal}(\mathcal{F})$$

$$\text{Safe}(\mathcal{F}) \triangleq \text{SingleOrder} \wedge \text{RealTimeWrites} \wedge \text{SeqRVal}(\mathcal{F})$$

where $$\text{RealTimeWrites} \triangleq \text{rb}|_{wr \to op} \subseteq \text{ar}$$

only restrict the real-time sequence of write operations before the read operation or other write operations
and $$\text{SeqRVal}(\mathcal{F}) \triangleq \forall \text{op} \in H : \text{Concur}(\text{op}) = \emptyset \Rightarrow \text{op.oval} \in \mathcal{F}(\text{op}, \text{cxt}(A, \text{op}))$$

limit the consistency of the return value to that read-only operations cannot be concurrent with any write operation $\mathcal{F}$ represents a function for obtaining a return value of a read/write operation, SingleOrder represents a single global order, RealTimeWrites represents a real-time write mechanism, RVal represents a return value meeting the consistency condition, SeqRVal represents that if there is any operation op belongs to that a historical result is a null set during concurrence, then it can be deduced that a return value of the operation belongs to a context function where the operation is located, rb represents a partial order relation of H, wr represents a write operation, op represents a read/write operation of a current transaction, ar represents a total order of H, H represents a series of historical operations, Concur represents a concurrent operation, op.oval represents a return value of the read/write operation, ext represents a context, and A represents a data object.

Figure 3:
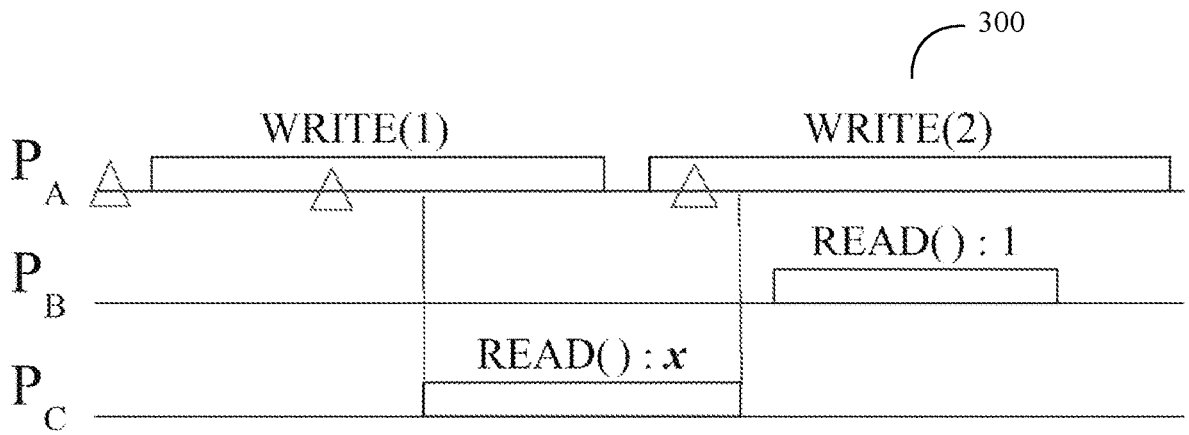
FIG. 3 is a schematic diagram of evolution of a linearizability serializability consistency level provided by an embodiment of this disclosure.

FIG. 3 is a schematic diagram of evolution of a linearizability serializability consistency level provided by an embodiment of this disclosure. As shown in 300, $P_A$, $P_B$ and $P_C$ represent concurrent execution of read and write (advanced according to Real-Time from left to right) in three progresses of A, B and C respectively. A variable x is initialized as 0. $P_C$ is read according to the semantics of the linearizability level, and x is allowed to be 0 or 1. According to the semantics of the linearizability-regular level, x is allowed to be 0, 1 or 2. In a case that reading is performed according to the semantics of the linearizability-safe level, x is any value.

In the following, a prove by contradiction method will be used for proving that under the action of transactions, it is not possible to read a value 2 written by $P_A$ in FIG. 3, that is, there cannot be various linearizability serializability consistencies existing in the definition of transactions. Each operation in FIG. 3 is regarded as one transaction. According to the characteristics of transactions, recoverability (i.e., read committed consistency needs to be guaranteed) needs to be satisfied. Assuming that the Read operation of $P_C$ may read Write(2), while $P_C$-read-ets<$P_A$-write(2)-ets, that is, at a transaction execution moment of $P_C$, the second transaction of $P_A$ has not been completed, recoverability is not satisfied in a database, and thus $P_C$ cannot read a value 2 written by $P_A$ and can only read write(1) or write(0) of $P_A$. Therefore, in a transaction type database, due to the influence of recoverability, the efficacy of consistency at the linearizability-regular level and the linearizability-safe level is equivalent to that of linearizability serializability consistency.

Based on the definitions of the above concurrent levels, it can be learnt that the concurrent levels in the database provided by the embodiment of this disclosure can be separately set in different concurrent transactions, i.e., only effective for a single transaction, that is, various concurrent levels coexist in the concurrent transactions, in other words, the concurrent levels are independently determined with transactions as the units, and same or different concurrent levels can be configured for different transactions in the system. The semantics of "isolation" is the semantics of keeping this transaction at a certain isolation level under the isolation level, which makes isolation have the semantics related to this transaction, regardless of other transactions.

The various consistency levels of a concurrent consistency model can be distinguished from three perspectives:

System perspective: various consistencies are within one system, at the same time, different transactions are kept at different concurrent consistency levels, making the system have a plurality of consistency states at the same time, so that the system is in a "split" state, and the semantics of the various consistency levels of the concurrent consistency model cannot be defined from the system perspective.

User perspective: in transaction execution of different users, for the different users, keeping operated objects at a consistent view angle for the users is a feasible way; and this way is similar to the semantics of the "isolation level", that is, the various consistency levels of the concurrent consistency model are localized from the users' perspectives, and thus the various consistency levels of the concurrent consistency model are defined from this perspective, so that the various consistency levels of the concurrent consistency model coexist in the concurrent transactions.

System-based user perspective: within the same period of time, it is a dilemma situation to keep not in the "split" state at the system level and to satisfy the consistency of user perspectives. Staged consistency is defined by using a system-level parameter pmodel, and according to the previously defined strength levels, algorithms for the consistency levels to come effect are given as follows:

Strong consistency effectiveness: only the strong consistency level is included, at the moment, the global clock is required to guarantee global consistency, and thus various levels that can only be under the strong consistency level coexist within the same time phase.

Non-strong consistency effectiveness: other levels except the strong consistency level, including serializability consistency and other weaker levels, and because the global clock is not relied on, the levels coexist within the same time phase.

pmodel=UM is defined, i.e., a user mode, all consistency levels of the concurrent consistency model are forced to coexist, but actually inconsistency problems exist.

pmodel=SFM is defined, i.e., a strong hybrid mode, and various levels under the strong consistency level are allowed to coexist within the same time phase. pmodel=WFM is defined, i.e., a weak hybrid mode, and serialization consistency and other weaker levels are allowed to coexist.

Through the above definitions of the system-level parameter pmodel, the concurrent consistency levels that coexist in one database system can be provided, so that the various consistency levels of the concurrent consistency model have semantics related to this transaction, and can coexist in the concurrent transactions.

Figure 4:
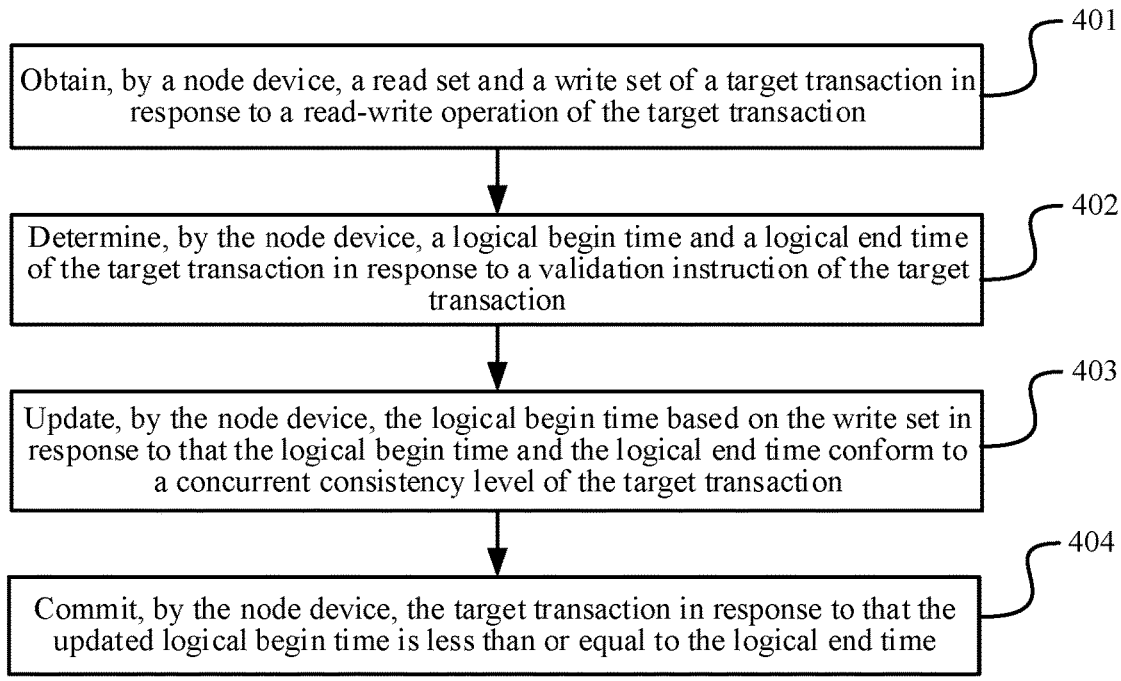
FIG. 4 is a flowchart of an exemplary transaction processing method provided by an embodiment of this disclosure.

FIG. 4 is a flowchart of a transaction processing method provided by an embodiment of this disclosure. Referring to FIG. 4, the embodiment is applicable to a database system, the database system includes a single-machine system or a distributed system, the embodiment of this disclosure is described by taking a node device of the single-machine system as an example, and the embodiment includes the following content.

401, obtain, by a node device, a read set and a write set of a target transaction in response to a read-write operation of the target transaction.

The target transaction is a global transaction or a local transaction, and the embodiment of this disclosure is described by taking an example that the target transaction is the local transaction.

In some embodiments, the node device and a terminal establish a session, and the session is used for processing the target transaction. The node device receives a target transaction executing request transmitted by the terminal, executes the read-write operation of the target transaction in response to the executing request and obtains the read set and the write set of the target transaction. The read set is used for storing to-be-read data items that are visible relative to the target transaction. In other words, the visible data items involved in a read operation of the target transaction form the read set of the target transaction. The write set is used for storing to-be-written data items of the target transaction. In other words, the data items involved in a write operation of the target transaction form the write set of the target transaction.

Optionally, the terminal is any electronic device corresponding to a user, including but not limited to: at least one of a smart phone, a tablet computer, a laptop, a desk computer, a smart speaker or a smart watch, and the type of the terminal is not specifically limited in the embodiment of this disclosure.

Optionally, an application client is installed on the terminal. The application client is any client that can provide data service, for example, the application client includes at least one of a payment application client, a take-out application client, a taxi-taking application client or a social application client, and the type of the application client is not specifically limited in the embodiment of this disclosure.

In some embodiments, at a session establishing stage, the application client on the terminal establishes the session with the node device through the following approach: the application client transmits an executing request of a target transaction $T_i$, a meta information system checks whether the current client has established a session with the node device, and the currently established session is reused in a case that the session has been established; and in a case that no session has been established, the node device and the application client establish a session relation.

402, determine, by the node device, a logical begin time and a logical end time of the target transaction in response to a validation instruction of the target transaction.

In some embodiments, after the target transaction is executed, a validation stage of the target transaction is entered, and the node device reads a logical begin time Bts and a logical end time Ets from a transaction status list of the target transaction in response to the validation instruction of the target transaction. The aforementioned implementation environment has introduced that each transaction involves two global clocks, that is, the logical begin time Bts and the logical end time Ets both belong to a global time stamp, the global time stamp can be generated by a global time stamp generating cluster, the global time stamp adopts at least one of a physical clock, a logical clock, a hybrid physical clock or a hybrid logical clock, and the type of the global time stamp is not specifically limited in the embodiment of this disclosure. The logical begin time Bts represents a global clock that the target transaction begins to be executed logically, the logical end time Ets represents a global clock that the target transaction begins to be committed logically, and in an initialization stage of the target transaction, the logical begin time Bts is initialized as 0, and the logical end time Ets is initialized as +∞. With the execution of the target transaction, it is possible that a coordinating node device, a data node device and the like assign values to the logical begin time Bts or the logical end time Ets again (i.e., modifying values of time stamps in the transaction status list), so that finally in the validation stage triggered by the validation instruction, the logical begin time Bts and the logical end time Ets are not initial values anymore.

In some embodiments, in the validation stage, the node device needs to validate whether the logical begin time Bts and the logical end time Ets of the target transaction meet a concurrent consistency level of the target transaction. The concurrent consistency level refers to a consistency isolation level with the transaction as the unit and supporting concurrent transactions, the concurrent consistency level performs level dividing on behaviors of all types of transactions in the database on data items, in the same database system, different transactions are allowed to satisfy different concurrent consistency levels, and validation processes of the levels will be described below.

i) Serialization Consistency

The node device obtains a concurrent transaction $T_j$ of the target transaction $T_i$ in a case that the concurrent consistency level is serialization consistency; the node device obtains a newest completed transaction time stamp Newts of a session to which the target transaction belongs in a case that the logical end time of the target transaction is less than a logical begin time of the concurrent transaction ($T_i$.ets<$T_j$.bts) or the logical begin time of the target transaction is greater than a logical end time of the concurrent transaction ($T_j$.ets<$T_i$.bts); and the node device determines that it conforms to the concurrent consistency level in a case that the logical end time of the target transaction is greater than or equal to the newest completed transaction time stamp ($T_i$.ets≤Newts).

Since in the serialization consistency level, any two transactions need to satisfy serialization queuing execution, the node device needs to inquire all concurrent transactions (possibly zero, one or more) of the target transaction, in a case that there is no concurrent transaction, validation is passed directly, and step 403 is performed, and n a case that there is at least one concurrent transaction, it needs to validate that the target transaction and the concurrent transactions can be serially executed. Since the logical begin time and the logical end time can form a logical time interval, validating serial execution is equivalent to validating whether logical time intervals of the target transaction and the concurrent transactions have intersections, in a case that the logical time intervals of the target transaction and all the concurrent transactions have no intersection, validation is passed, and step 403 is performed, and in a case that the logical time intervals of the target transaction and any concurrent transaction have an intersection, the target transaction is rolled back.

ii) Strict Serializability Consistency

The node device obtains a concurrent write transaction $T_j$ of the target transaction $T_i$ in a case that the concurrent consistency level is strict serializability consistency and the target transaction is a write transaction; the node device obtains a concurrent read-only transaction $T_k$ of the concurrent write transaction in a case that the logical end time of the target transaction is less than a logical begin time of the concurrent write transaction ($T_i$.ets<$T_j$.bts) or the logical begin time of the target transaction is greater than a logical end time of the concurrent write transaction ($T_j$.ets<$T_i$.bts); the node device obtains a newest completed transaction time stamp Newts of a session to which the target transaction belongs in a case that a logical begin time of the concurrent read-only transaction is greater than the logical begin time of the concurrent write transaction ($T_j$.bts<$T_k$.bts); and the node device determines that it conforms to the concurrent consistency level in a case that the logical end time of the target transaction is greater than or equal to the newest completed transaction time stamp ($T_i$.ets≤Newts).

Since in the strict serializability consistency level, any two concurrent write transactions need to keep serial execution, in a case that the target transaction is the write transaction, all concurrent write transactions of the target transaction need to be inquired, and it is validated that the two concurrent write transactions keep serial execution. In addition, indirect concurrent transactions of the target transaction further need to be obtained through the concurrent read-only transactions of the concurrent write transactions, so that the future read exception can be avoided based on clock validation.

iii) Linearizability Serializability Consistency

The node device obtains a concurrent write transaction $T_j$ of the target transaction $T_i$ in a case that the concurrent consistency level is linearizability serializability consistency and the target transaction is a write transaction; the node device obtains a concurrent read-only transaction $T_k$ of the concurrent write transaction in a case that the target transaction and the concurrent write transaction pass serializability validation; the node device obtains a newest completed transaction time stamp Newts of a session to which the target transaction belongs in a case that a logical begin time of the concurrent read-only transaction is greater than the logical begin time of the concurrent write transaction ($T_j$.bts<$T_k$.bts); and the node device determines that it conforms to the concurrent consistency level in a case that the logical end time of the target transaction is greater than or equal to the newest completed transaction time stamp ($T_i$.ets≤Newts).

Since in the linearizability serializability consistency level, any two write transactions do not need to be serially executed, but serializability between the concurrent write transactions needs to be validated, whether the target transaction and the concurrent write transactions satisfy serializability only needs to be validated in a case that the target transaction is the write transaction, and other steps are similar to those of the strict serializability consistency level, which are omitted here.

iv) Sequential Serializability Consistency

The node device obtains a concurrent transaction $T_j$ of the target transaction $T_i$ in a case that the concurrent consistency level is sequential serializability consistency; the node device determines a first transaction $T_a$ belonging to the same session with the target transaction in a case that the target transaction and the concurrent transaction pass serializability validation; the node device obtains a newest completed transaction time stamp Newts of the session in a case that the logical end time of the target transaction is less than a logical begin time of the first transaction ($T_i$.ets<$T_a$.bts); the node device determines that it conforms to the concurrent consistency level in a case that the logical end time of the target transaction is greater than or equal to the newest completed transaction time stamp ($T_i$.ets≤Newts); and the node device updates a logical begin time of a result transaction in a causal relation in a case that a causal relation is included between the target transaction and the first transaction, so as to make an updated logical begin time of the result transaction greater than a logical end time of a reason transaction.

Since in the sequential serializability consistency level, any type of transaction can be executed concurrently or parallelly, only the concurrent transaction needs to be subjected to serializability validation, but in the sequential serializability consistency level, it further needs to additionally guarantee that transactions in the same session are kept increasing gradually, that is, serializability considering a partial order relation can be achieved.

v) Serializability Consistency

The node device obtains a concurrent transaction $T_j$ of the target transaction $T_i$ in a case that the concurrent consistency level is serializability consistency; the node device determines a first transaction $T_a$ belonging to the same session with the target transaction in a case that the target transaction and the concurrent transaction pass serializability validation; and the node device determines that it conforms to the concurrent consistency level in a case that the logical end time of the target transaction is less than a logical begin time of the first transaction and the logical begin time is less than or equal to the logical end time ($T_i.\text{ets} < T_a.\text{bts}$ and $T_i.\text{bts} < T_j.\text{ets}$).

The serializability consistency level is similar to the sequential serializability consistency level, but the partial order relation is not considered, which is omitted here.

vi) Causal Repeatable Read Consistency

The node device obtains a result transaction $T_j$ that has a causal relation with the target transaction $T_i$ and is caused by the target transaction in a case that the concurrent consistency level is causal repeatable read; and the node device updates a logical begin time of the result transaction to make an updated logical begin time of the result transaction greater than the logical end time of the target transaction ($T_i.\text{ets} < T_j.\text{bts}$), so as to determine that it conforms to the concurrent consistency level.

Since in the causal repeatable read consistency level, serializability does not need to be validated, but it needs to guarantee that any two transactions having the causal relation are ordered, a clock of the result transaction needs to be adjusted according to a clock of the target transaction to ensure that there is no read partial order exception.

vii) Repeatable Read Consistency, Read Committed Consistency and Read Uncommitted Consistency The node device determines that it conforms to the concurrent consistency level in a case that the concurrent consistency level is repeatable read consistency, read committed consistency or read uncommitted consistency.

Since in the repeatable read consistency, the read committed consistency and the read uncommitted consistency, the partial order relation does not need to be considered, nor serializability validation needs to be performed, step 403 is directly performed.

403, update, by the node device, the logical begin time based on the write set in response to that the logical begin time and the logical end time conform to a concurrent consistency level of the target transaction.

Step 403 is that the node device updates the logical begin time based on the write set in a case that the logical begin time and the logical end time conform to a concurrent consistency level of the target transaction.

In some embodiments, the node device obtains at least one piece of to-be-written transaction information WT of at least one data item in the write set, the at least one piece of to-be-written transaction information WT being used for identifying a transaction that is modifying the at least one data item; the logical begin time is adjusted in response to that the at least one piece of to-be-written transaction information WT is null; and the target transaction is rolled back in response to that any piece of to-be-written transaction information WT in the at least one piece of to-be-written transaction information WT is not null.

In other words, the node device obtains to-be-written transaction information WT of each data item in the write set, the to-be-written transaction information WT being used for identifying a transaction that is modifying the data item; the logical begin time is updated in a case that the to-be-written transaction information WT of each data item is null; and the target transaction is rolled back in a case that the to-be-written transaction information WT of any data item is not null.

In some embodiments, in a case that the to-be-written transaction information WT of all the data items is null, the node device performs following updating operations on the logical begin time: for each data item in the at least one data item, the to-be-written transaction information of the each data item is obtained and used as a transaction identifier of the target transaction; the logical begin time is updated to be greater than a maximum read transaction time stamp of the each data item, in other words, the logical begin time is updated to make the updated logical begin time greater than the maximum read transaction time stamp of the data item, that is to say, a value is assigned to the logical begin time by using a clock value greater than the maximum read transaction time stamp of the data item, the maximum read transaction time stamp being used for representing a maximum value in logical end times of transactions that have read the data item; the logical begin time is adjusted based on an active transaction set in a case that the updated logical begin time and the logical end time conform to the concurrent consistency level of the target transaction, in other words, the logical begin time that has been updated once is updated again based on the active transaction set, that is to say, the logical begin time that has been assigned the value once is assigned with a new value again, the active transaction set being used for identifying transactions that have begun to be performed but have not been committed; and the target transaction is rolled back in a case that the updated logical begin time and the logical end time do not conform to the concurrent consistency level of the target transaction.

In some embodiments, for each data item y in the write set, the node device checks whether the to-be-written transaction information WT of the data item y is null, and in a case that the to-be-written transaction information WT of the data item y is not null, it shows that there are other transactions that are modifying the data item y and said other transactions have entered the validation stage, so the target transaction $T_i$ is rolled back to eliminate write-write conflicts; otherwise, in a case that the to-be-written transaction information WT of the data item y is null, the to-be-written transaction information WT of the data item y is locked at first to prevent other concurrent transactions from modifying the data item y concurrently, for example, a suggestion lock is applied to the data item y, so that only a modification operation on the to-be-written transaction information WT of the data item y is mutually excluded, and a read-only operation for the data item y can be normally executed.

In some embodiments, after locking is completed, the node device updates the to-be-written transaction information WT of the data item y as a transaction identifier $T_i.\text{TID}$ of the target transaction $T_i$, in other words, the transaction identifier $T_i.\text{TID}$ of the target transaction $T_i$ is assigned to the to-be-written transaction information WT of the data item y. Next, $T_i.\text{bts}$ is updated to be greater than the maximum read transaction time stamp Rts of the data item y, in other words, the logical begin time $T_i.\text{bts}$ of the target transaction is updated to make the updated logical begin time greater than the maximum read transaction time stamp Rts of the data item y, that is to say, a value is assigned to the logical begin time by using a clock value greater than the maximum read transaction time stamp Rts of the data item y. Rts records a maximum value in logical end times of all the transactions that have read the data item y, for example, $T_i.\text{bts}=\max(T_i.\text{bts}, y.\text{cts}+1)$, where Cts refers to a final logical end time of the transaction which generates the data item y. In the above process, read-write conflicts can be eliminated by adjusting the logical begin time.

In some embodiments, the node device uses a non-lock compare and swap (CAS) technology to assign a value to the to-be-written transaction information WT of the data item y, so as to improve the system performance.

In some embodiments, the active transaction set includes a first transaction set and a second transaction set, the first transaction set is used for identifying transactions in a committing status or in a status of passing validation, and the second transaction set is used for identifying transactions in a running status. Based on this, in a case that the node device updates the logical begin time based on the active transaction set, the following approach is adopted: the logical begin time is updated to be greater than a maximum logical end time in the first transaction set, in other words, the logical begin time is updated to make the updated logical begin time greater than the maximum logical end time in the first transaction set, that is to say, a value is assigned to the logical begin time by using a clock value greater than the maximum logical end time in the first transaction set; a logical end time of transactions in the second transaction set is adjusted to be less than the updated logical begin time in a case that the updated logical begin time is less than or equal to the logical end time, in other words, the logical end time of the transactions in the second transaction set is updated to make the updated logical end time of the transactions less than the updated logical begin time of the target transaction, that is to say, a value is assigned to the logical end time of the transactions in the second transaction set by using a value less than the updated logical begin time of the target transaction; and the target transaction is rolled back in a case that the updated logical begin time is greater than the logical end time.

In some embodiments, the node device obtains a first transaction set $T_1$ that is in the committing status or in the status of passing validation, and adjusts the logical begin time $T_i$.bts of the target transaction $T_i$ to make it greater than $T_1$.ets of each transaction in $T_1$, that is, $T_i.bts=\max(T_i.bts, T_1.ets+1)$. Next, the node device obtains a second transaction set $T_2$ in the running status, and adjusts $T_2$.ets of each transaction in $T_2$ to make it less than the logical begin time $T_i$.bts of the target transaction $T_i$, that is $T_2.ets=\min(T_2.ets, T_i.bts-1)$.

In the above process, by means of the first transaction set, read-write conflicts between write of this transaction and read that has occurred of other completed transactions can be eliminated, so that the write operation of this transaction is postponed to be after the read operation of transactions that have completed reading. By means of the second transaction set, read-write conflicts between write of this transaction and read of other ongoing transactions can be eliminated, so that other transactions cannot read data written by this transaction.

In some embodiments, the transaction is rolled back in a case that a logical begin time of any transaction in the second transaction set is greater than the updated logical end time of the transaction. That is, in a case that the target transaction is validated, in response to that a transaction with an illegal logical time interval is detected in the adjusted second transaction set, this transaction in the second transaction set is rolled back immediately, so that the system performance can be further improved.

404, commit, by the node device, the target transaction in response to that the updated logical begin time is less than or equal to the logical end time.

Step 404 is that the node device commits the target transaction in a case that the updated logical begin time is less than or equal to the logical end time.

In some embodiments, at a committing stage of the target transaction, the node device writes the data in the write set of the target transaction into a disk and makes the data persistence into a database, for each data item x in the read set, a maximum read transaction time stamp Rts of the data item x is modified to be greater than or equal to $T_i$.cts, that is $x.rts=\max(x.rts, T_i.cts)$, where $T_i$.cts refers to a logical end time of the target transaction when it is finally committed after multiple times of adjustment (or called assignment and updating). Then, the transaction $T_i$ itself is deleted from the active transaction set RTlist(x) of the data item x. For each data item y in the write set, wts and rts of a new version of y are updated, firstly, wts of the new version is made to be equal to $T_i$.cts, then rts of the new version is made to be equal to $\max(x.rtx,T_i.cts)$, the new version is made persistence into the database, and Flag (a parameter) is modified. Next, the active transaction set RTlist(y) of the data item y is emptied, and the to-be-written transaction information WT of the data item y is emptied. wts is a time stamp created by the new version of y, and rts is a maximum read transaction time stamp of the new version of y.

In some embodiments, the node device empties the read set and the write set of the target transaction $T_i$, updates Bts of T in LocalTS (local transaction status list) to be T.cts, and sets the transaction status of the target transaction $T_i$ to be a committed status.

All of the above optional technical solutions can be combined randomly to form optional embodiments of the present disclosure. Details are not described herein again.

According to the method provided by the embodiment of this disclosure, through obtaining the read and write sets of the target transaction at the executing stage of the target transaction, whether the target transaction conforms to own concurrent consistency levels is validated based on the logical begin time and the logical end time of the target transaction at the validation stage, and the logical begin time is dynamically updated based on predetermined policies, so that in a case that the finally updated logical begin time and the logical end time are legal, data exceptions not allowed by the own concurrent consistency levels cannot occur, and then the target transaction is committed, which can make different transactions in the whole system correspond to the different concurrent consistency levels, thereby greatly improving the data exception detection accuracy and improving the transaction processing efficiency and the performance of the database system.

In the above embodiment, some basic introductions are given to the concurrent control access algorithms by taking the single-machine system as an example, and in an embodiment of this disclosure, the concurrent access control algorithms of the various concurrent levels will be described in detail by taking a decentralized distributed system as an example.

Firstly, a decentralization algorithm is introduced.

In a transaction processing process, there are two centralization components, one is a clock generator, and the other is a transaction coordinator.

Clock generator: i.e., the aforementioned global clock, namely the global time stamp generating cluster. Relatively, a local clock is a non-centralization component.

Transaction coordinator: at a transaction validation stage, serializability or no-data-exception validation needs to be performed on whether a distributed transaction conforms to transaction consistency, so a transaction coordinator is needed, namely a coordinating node device or a coordinator.

The decentralization algorithm refers to that the advancement of an algorithm process is achieved without relying on the centralization components as much as possible.

Table 2 shows features and implementations of the decentralization algorithm based on a concurrent consistency model, as shown in Table 2.

the global perspective. For other consistency levels, only a local time stamp needs to be obtained (for the distributed transaction, the local time stamp is obtained from the

TABLE 2

|  | Serialization consistency | Strict serializability consistency | Linearizability serializability consistency | Sequential serializability consistency | Serializability consistency |
|---|---|---|---|---|---|
| Basic feature | All transactions are serially executed | Read and write operations conform to Real-Time | Write operation conforms to Real-Time | Committing operation conforms to Real-Time | Same as the left |
| Implementation | Global time stamp | Global time stamp | Global time stamp T/O mechanism with committing time stamp as benchmark | Global or local time stamp based on DTA algorithm | Based on DTA algorithm |
| Snapshot time stamp | Transaction begin time | Transaction begin time | Global time stamp at the beginning of transaction, not allowed to be smaller (not allowing old read) | Global time stamp at the beginning of transaction, allowed to be smaller (allowing old read) | HLC at the beginning of transaction |
| Committing time stamp | Global time stamp | Global time stamp | Global time stamp | Global time stamp/local time stamp (local transaction) | Hybrid logical clock |
| Bts | Non-adjustable | Initialized as snapshot, non-adjustable | Initialized as snapshot, non-adjustable | Initialized as snapshot, adjustable to be smaller | Same as the left |
| Ets | Non-adjustable | Adjustable | Adjustable | Adjustable | Same as the left |
| Exceptions | No exception | Existing: future read, causal loss | Same as the left | Same as the left + old read | Same as the left |

A process of the decentralization algorithm is mainly divided into the following four stages.

Stage I, begin to obtain, by a transaction, Bts, i.e., a snapshot stage establishing a transaction: For a strong consistency level and an intermediate consistency level, a view angle of reading data needs to be established from the global perspective, so that Bts of a target transaction needs to be obtained from a global clock. Optionally, the global clock, such as the global time stamp generating cluster involved in the above implementation environment, is a centralization component. Optionally, a global transaction adopts the Truetime mechanism to form a decentralization component.

Stage II, perform, by a transaction, read and write on a data item, i.e., a transaction semantics implementation operation stage: work of whether centralization is performed is not involved.

Stage III, a transaction legality validation stage before committing of a transaction: at this point, a decentralization validation manner is adopted, and a decentralized transaction validation technology is achieved by utilizing a dynamic timestamp allocation (DTA) algorithm of a timestamp ordering (TO) algorithm.

Stage IV, a transaction committing or rolling-back operation ending stage: as for a committing operation of a transaction, for the strong consistency level and the intermediate consistency level, a global committing time stamp of the transaction needs to be established on a data item from transaction coordinator; and for the local transaction, the local time stamp is obtained from a local node).

In the following, a transaction processing flow based on the concurrent consistency model in the distributed system will be discussed respectively according to the four stages involved in the above decentralization algorithm.

(I) Begin to Obtain, by a Transaction, Bts, i.e., a Snapshot Stage Establishing a Transaction A target transaction T is transmitted by a client to a coordinating node device (i.e., the coordinator). The target transaction T is initialized on the coordinating node device, and initialization contains the following steps:

Firstly, the coordinating node device allocates a global unique transaction identifier TID (i.e., a transaction number) to the target transaction T. The TID represents that the transaction is determined to come from a certain particular session, and under the distributed system, whether some transactions are transactions that come from the same session is identified through the TID (i.e., identifying a partial order relation).

In some embodiments, there are a plurality of methods for representing "whether the transactions come from the same session" by utilizing "TID", for example, first 96 bits of a 128-bit TID are used for representing a session, or sessions are registered at one central node in a centralized mode and then are uniquely numbered at the central node in a unified mode.

Second, the coordinating node device records a status of the target transaction T in a transaction status list, for example, a status of the target transaction T is set as Grunning, and Bts and Ets are initialized to be 0 and +∞ respectively.

(II) Perform, by a Transaction, Read and Write on a Data Item, i.e., a Transaction Semantics Implementation Operation Stage After the target transaction T is initialized on the coordinating node device, an executing stage of the transaction is started.

At a reading stage, the target transaction T reads required data items according to an executing logic and writes read data item updating to a local internal memory of the target transaction T, namely a local internal memory of the coordinating node device. In a case that the target transaction T needs to read a data item x, the following steps are executed.

2.1 The coordinating node device of the target transaction T needs to transmit a data reading request message ReadRequestMessage (rrqm for short) requesting to read the data item x to a data node device RM (resource manager, a participant of the transaction, i.e., an executor of a sub transaction) where the data item x is located, and values of four fields of rrqm are as shown in 2.1.1-2.1.4 below respectively.

2.1.1 TID, TID of the target transaction T.

2.1.2 Bts, in a case that it is a level above the serializability consistency level, the coordinating node device obtains a time stamp value from the global clock; otherwise, it is Bts of the target transaction T on the coordinating node device; and for serializability consistency and weaker levels, it is a time value determined by the hybrid logical clock (HLC) on the coordinating node device. In some embodiments, serializability consistency and weaker levels are implemented with the global clock, but considering the factors such as message synchronization efficiency, the embodiment of this disclosure is described by taking an example that the HLC is adopted, however, this does not mean that the embodiment of this disclosure completely excludes the use of the global clock for serializability consistency and weaker levels.

2.1.3 Ets, a clock obtaining manner is similar to Bts, which is omitted here.

2.1.4 ReadPlan, a query plan for the target transaction T to read the data item x.

2.2 After the data node device RM where the data item x is located receives the message rrqm, the following steps are executed in sequence.

2.2.1 The RM checks whether local LocalTS (local transaction status table) contains information of the target transaction T: in a case that LocalTS does not contain the information of the target transaction T, the information of the target transaction T is initialized on LocalTS, that is, a record is inserted into LocalTS, and values are rrqm.TID, rrqm.Bts, rrqm.Ets and rrqm.Running respectively; and in a case that LocalTS contains the information of the target transaction T, that is, before the target transaction T reads the data item x, other data items on the RM are further accessed, the information of the target transaction T is updated to make T.Bts=max(T.Bts, rrqm.Bts) and T.Ets=min(T.Ets, rrqm.Ets), that is, Bts of the target transaction T in LocalTS is updated as a maximum value between an original value and the values carried in rrqm, and Ets is updated as a minimum value between an original value and the values carried in rrqm.

2.2.2 The RM checks whether T.Bts is less than or equal to T.Ets, in a case that T.Bts≤T.Ets, the data item x continues to be read, otherwise, in a case that T.Bts>T.Ets, the status of the target transaction T in LocalTS is updated as Aborted, i.e., T.Status=Aborted, a rolling-back Abort message is returned to the coordinating node device of T, that is, a read request reply message rrpm is transmitted to a host RM (coordinating node device) of the target transaction T, and a field IsAbort in the read request reply message rrpm is set to be 1, i.e., rrpm.IsAbort=1, indicating rolling-back of the target transaction T.

2.2.3 The RM finds a proper visible version from a version status set of the data item x according to a logical time interval [Bts, Ets] of the target transaction T, that is, a target data item that is visible relative to the target transaction T is inquired. To find the target data item of the data item x, checking is to be started from a newest committed data version (hereinafter referred to as a newest version) at first, and in a case that T.ets is greater than wts of the newest version, the newest version is the target data item. Otherwise, it is not the target data item, a former version of the newest version needs to be searched, and so on, until the first data version x.v meeting T.ets>wts is found, and the data version x.v is obtained as the target data item, where wts is a creating time stamp of x.v.

2.2.4 After the RM finds the target data item x.v, Bts of the target transaction T needs to be modified to make T.Bts>x.v.wts, so as to eliminate write-read exceptions. Additionally, in a case that the found version is the newest version of x, the following operations need to be executed: firstly, whether to-be-written transaction information WT (WT records a transaction identifier of a transaction that is modifying x and passes validation) corresponding to x.v is null is checked, in a case that WT corresponding to x.v is not null (a value is assumed to be TID1, and a transaction corresponding to TID1 is $T_1$), Ets of the target transaction T is adjusted to meet T.Ets<$T_1$.Bts, so as to eliminate read-write conflicts; secondly, the transaction identifier T.TID of the target transaction T is added into an active transaction set RTlist of x.v; and finally, x is added into a local read set of the target transaction T.

2.2.5 The RM returns a read request reply message ReadReplyMessage, rrpm for short, to the coordinating node device of the target transaction T. Bts and Ets of rrpm record an upper bound and a lower bound of a logical time stamp of the transaction T on the current RM respectively, and Value records a value of the read data item.

2.3 After the coordinating node device of the target transaction T receives the RM read request reply message rrpm, the following processing is performed in sequence.

2.3.1 The coordinating node device checks whether the received message is an Abort message, that is, whether rrpm.IsAborts is equal to 1 is checked, and in a case that it is yes, rrpm.IsAbort=1, a global rolling-back stage is entered; otherwise, rrpm.IsAbort≠1, step 2.3.2 continues to be executed.

2.3.2 The coordinating node device updates a status of the target transaction T in the transaction status list: the target transaction T is updated to make T.Bts=max(T.Bts, rrpm.Bts) and T.Ets=min(T.Ets, rrpm.Ets), that is, Bts of the target transaction T is updated as a maximum value between an original value and the values carried in rrpm, and Ets is updated as a minimum value between an original value and the values carried in rrpm.

2.3.3 The coordinating node device checks whether T.Bts is greater than T.Ets in the transaction status list, and in a case that it is yes, T.Bts>T.Ets, the global rolling-back stage is entered; otherwise, T.Bts≤T.Ets, the transaction continues to be executed.

In a case that the coordinating node device decides to roll back the transaction T, the status of the target transaction T in the transaction status list needs to be modified to Gaborting, and relevant sub nodes (all RM relevant to the target transaction T) are notified to execute local rolling-back.

It can be seen through analysis that at the reading stage of the target transaction T, communication mainly occurs between the coordinating node device of the target transaction T and the relevant sub RM. Two times of communication is required every time the target transaction T successfully reads data once: the coordinating node device of the target transaction T transmits the data reading request information rrqm to the relevant sub RM; and the relevant sub RM transmits the read request reply information rrpm to the coordinating node device. Therefore, at most 2n times of communication is performed at the reading stage, and the maximum communication amount is n×(magnitude of the request message rrqm+magnitude of a response message rrpm), where n is the number of times of remote reading.

In some embodiments, in response to that the target transaction T needs a plurality of data items of a certain relevant sub RM, the data reading request information rrqm of these data items is packed and transmitted to read these data in batches, thereby reducing the number of times of communication.

After the target transaction T reads the required data at the reading stage and writes the updating to the local internal memory, the validation stage is entered.

(III) A Transaction Legality Validation Stage Before Committing of a Transaction At the validation stage, the target transaction T validates whether the target transaction T has conflicts with other transactions and decides whether to commit or roll back the target transaction T finally according to results of the validation stage. A validation process of the target transaction T includes the following content.

3.1 The coordinating node device of the target transaction T modifies a status of the target transaction T in the transaction status list to be: Gvalidating; and transmits a validation request message, ValidateRequestMessage, vrm for short, to each relevant sub RM involved in the target transaction T, and Bts and Ets in vrm record an upper bound and a lower bound of a transaction logical time stamp of the target transaction T in the transaction status list respectively. Optionally, a local write set of RM is further transmitted to RM together with the validation request message vrm.

3.2 After each relevant sub RM involved in the target transaction T receives the validation request information vrm, a local validation operation is executed, and the local validation operation needs to execute the following steps in sequence.

3.2.1 The RM updates the target transaction T in LocalTS to make T.Bts=max(T.Bts, vrm.Bts) and T.Ets=min(T.Ets, vrm.Ets), that is, Bts of the target transaction T is updated as a maximum value between an original value and values carried in vrm, and Ets is updated as a minimum value between an original value and the values carried in vrm. What is updated is the logical time stamp information of the transactions in the local transaction status table, used for concurrent access control over the transactions, i.e., used for guaranteeing transaction consistency.

3.2.2 The RM checks values of bts and ets of the target transaction T under various concurrent consistency levels according to the definitions of the various concurrent consistency levels and the setting condition of a current pmodel value of the database system. In some embodiments, in a case that the concurrent consistency level is stronger than serializability consistency, the fact that bts of the transaction is not less than newts of this session further needs to be validated, and in a case that bts is less than newts, the target transaction T needs to be rolled back, because sequential consistency, for example, does not conform to a causal consistency condition required by the partial order relation. In some embodiments, in a case that the concurrent consistency level is equal to serializability consistency, whether T.Bts is greater than T.Ets is checked, in a case that it is yes, T.Bts>T.Ets, validation fails, and an Abort message is returned to the coordinating node device of the target transaction T (further causing global rolling-back), that is, a local validation reply message lvm is transmitted, where lvm.IsAbort=1; otherwise, T.Bts≤T.Ets, and it shows that it conforms to the concurrent consistency level, and validation of the next step is entered.

3.2.3 The RM finds every data item y in the write set and then checks whether to-be-written transaction information WT of the data item y is null. In a case that the to-be-written transaction information WT of the data item y is not null, it shows that there are other transactions that are modifying the data item y and said other transactions have entered the validation stage, so the target transaction T needs to be rolled back to eliminate write-write conflicts, that is, the Abort message is transmitted to the coordinating node device of the target transaction T; otherwise, in a case that the to-be-written transaction information WT of the data item y is null, the next step of operation is continued, for example, the to-be-written transaction information WT of the data item y is locked to prevent other concurrent transactions from modifying the data item y concurrently. Optionally, the RM applies a suggestion lock to the data item y, so that only a modification operation on the to-be-written transaction information WT of the data item y is mutually excluded.

3.2.4 The RM updates the to-be-written transaction information WT of each data item y in the write set to be T.TID (representing that the target transaction T entering the validation stage is to modify the data item y), and adjusts the logical begin time of the target transaction T in the local transaction status table to make it greater than the maximum read transaction time stamp rts of the data item y, i.e., T.Bts=max(T.Bts, y.cts+1), so as to eliminate read-write conflicts. Optionally, the RM uses a non-lock CAS technology to assign a value to the to-be-written transaction information WT of the data item y to improve the system performance, or, a value is assigned to the to-be-written transaction information WT of the data item y after locking, and whether WT is locked is not specifically limited in the embodiment of this disclosure.

3.2.5 The RM checks values of bts and ets of the target transaction T under various concurrent consistency levels according to the definitions of the various concurrent consistency levels and the setting condition of a current pmodel value of the database system. In some embodiments, in a case that the concurrent consistency level is stronger than serializability consistency, the fact that bts of the transaction is not less than newts of this session further needs to be validated, and in a case that bts of the transaction is less than newts of this session, the target transaction T needs to be rolled back, because sequential consistency, for example, does not conform to a causal consistency condition required by the partial order relation. In some embodiments, in a case that the concurrent consistency level is equal to serializability consistency, whether T.Bts is greater than T.Ets is checked, in a case that it is yes, T.Bts>T.Ets, validation fails, and an Abort message is returned to the coordinating node device of the target transaction T (further causing global rolling-back), that is, a local validation reply message lvm is transmitted, where lvm.IsAbort=1; otherwise, T.Bts≤T.Ets, and it shows that it conforms to the concurrent consistency level, and validation of the next step is entered.

3.2.6 For each data item y in the write set, the RM adjusts the time stamp of the target transaction T or a transaction in the active transaction set RTlist to eliminate read-write conflicts. An adjustment rule includes the following two cases.

Case I, write of this transaction and read that has occurred of other completed transactions, so that a write operation of this transaction is postponed to be after a read operation of transactions that have completed reading.

In some embodiments, the RM finds all transactions $T_1$ (first transaction set) that are in a committed status or a status of passing local validation, and adjusts the logical begin time of the target transaction T itself to make it greater than Ets of the transactions in $T_1$, i.e., T.Bts=max(T.Bts, $T_1$.Ets+1).

After T.Bts is adjusted, the RM checks whether the logical time interval of the target transaction T is still legal again, in a case that the logical time interval of the target transaction T is illegal, the Abort message is returned, otherwise, in a case that the logical time interval of the target transaction T is legal, the local transaction status of T is updated to Validated, i.e., T.Status=Validated, and the next step of adjustment is performed. Detecting whether the logical time interval is legal means that in a case that the logical begin time T.Bts is less than or equal to the logical end time T.Ets, the logical time interval is legal, otherwise, in a case that the logical begin time T.Bts is greater than the logical end time T.Ets, the logical time interval is illegal.

Case II, write of this transaction and read of other ongoing transactions, so that other transactions cannot read data written by this transaction.

In some embodiments, the RM finds out all transactions $T_2$ (second transaction set) in the running status, and adjusts the logical end time interval of the transactions in $T_2$ to make the logical end time less than Bts of the target transaction T. That is, $T_2$.Ets=min($T_2$.Ets, T.Bts−1).

In some embodiments, in a case that Bts of a certain transaction in $T_2$ is greater than Ets after adjusting the logical time interval, then the transaction in $T_2$ can be notified to be globally rolled back.

3.2.7 The RM determines that the target transaction T has passed local validation, a new version of y is created according to an updated value of the data item y, but flag (a parameter) needs to be set, representing that the new version has not been globally committed.

3.2.8 The RM returns the local validation reply message lvm of T to the coordinating node device of T, where Bts and Ets of lvm record the upper bound and the lower bound of the logical time stamp of the transaction T on the local RM respectively. In a case that local validation of the target transaction T fails, the status of the target transaction T in LocalTS needs to be updated to Aborted, i.e., T.Status=Aborted.

3.3 After the coordinating node device of T receives the local validation reply messages lvm of all RM, whether the target transaction T can pass global validation is determined according to the received messages, which is mainly divided into the following cases.

3.3.1 In a case that lvm with the field IsAbort being equal to 1 is contained, it shows that the target transaction T does not pass all local validations, and the coordinating node device decides to globally roll back the target transaction T; meanwhile, the status of the target transaction T in the transaction status list is updated to: Gaborting; and all the sub nodes RM are notified to complete local rolling-back, that is, a write committed/rolling-back message coarm is transmitted to the relevant RM, where coarm.IsAbort=1.

3.3.2 Otherwise, the field IsAbort in lvm returned by all the RM is equal to 0, the coordinating node device solves an intersection of the logical time intervals of all received target transactions T to obtain a new global logical interval [T.Bts, T.Ets], and if T.Bts>T.Ets, then it is decided to globally roll back the transactions, the statuses of the target transactions T in the transaction status list are updated to Gaborting, and all the sub nodes are notified to complete rolling-back; otherwise, T.Bts≤T.Ets, and the next step is performed.

3.3.3 The coordinating node device determines that T passes validation and randomly selects one time point from the global logical interval [T.Bts, T.Ets] as a finally committed time stamp of T to assign a value to cts. For example, one T.Bts is selected as the logical committing time stamp of T.

3.3.4 The coordinating node device updates the transaction status list to make T.Bts=T.Ets=T.cts; the statuses of the transactions in the transaction status list are updated to: Gcommitting; and in some embodiments, at the moment, the coordinating node device further records a global transaction status as Gcommitted, and requests the global time stamp generating cluster to allocate a final global time stamp at the same time to be recorded into the field Gts of the global transaction status.

3.3.5 The coordinating node device notifies the relevant RM to complete committing, that is, the write committed/rolling-back message coarm is transmitted to the relevant RM, where coarm.IsAbort=0, and coarm.Cts and coarm.Gts record the final committing time stamp and the final global time stamp of the transactions respectively.

It can be seen through analysis that at the validation stage of the target transaction T, communication mainly occurs between the coordinating node device of the target transaction T and the relevant sub RM. Communication mainly contains the following two steps: transmit, by the coordinating node device of the target transaction T, the validation request message vrm and the local write set of the RM to each relevant sub RM; and transmit, by each relevant sub RM, the local validation reply message lvm to the coordinating node device of the target transaction T.

Therefore, at most 2 m times of communication is needed at the validation stage, and the magnitude of the communication amount is m×(magnitude of the request validation message+magnitude of the validation reply message)+magnitude of a global write set, where m is the number of sub RM relevant to T.

(IV) A Transaction Committing or Rolling-Back Operation Ending Stage

At the ending stage, the target transaction T selects to execute write committing or rolling-back according to the validation result of the validation stage.

4.1 In a case that the target transaction T passes validation, a write committing stage is entered, that is, updating of the target transaction T to the data is made persistence into the database, and some subsequent cleaning work is done. A local RM needs to execute the following operations at the write committing stage.

4.1.1 The RM modifies rts of x for each to-be-read data item x in the read set to make it greater than or equal to T.cts, i.e., x.rtx=max(x.rtx, T.cts); and the RM is deleted from RTlist (x).

4.1.2 The RM updates wts and rts of the new version of y for each to-be-written data item y in the write set, where wts=T.cts, and rts=max(x.rtx, T.cts); y is made persistence into the database, and flag (a parameter) is modified; contents of the RTlist list of y are emptied; and contents of WT of y are emptied.

4.1.3 The RM empties the local read set and write set of the target transaction T.

4.1.4 The RM updates Bts of T in LocalTS to be equal to T.cts, and updates the status to committed (at the moment, the local transaction status table is only used for transaction consistency, and synchronization of the global transaction status is not involved).

4.1.5 The RM returns an acknowledge character (ACK) of successful committing to the coordinating node device of the target transaction T.

Optionally, after the coordinating node device of the target transaction T receives the ACK that all RM has completed committing, the global transaction status is modified to Gcommitted. Each RM is notified to clear the status of the target transaction T from the local transaction status table.

4.2 In a case that the target transaction T does not pass validation, the global rolling-back stage is entered, that is, the target transaction T is rolled back, and corresponding clearing work is done. The clearing work includes the following contents.

4.2.1 The RM deletes the target transaction T from RTlist(x) for each to-be-read data item x in the read set.

4.2.2 The RM clears a newly created version y and empties the contents of the to-be-written transaction information WT of y for each to-be-written data item y in the write set.

4.2.3 The RM empties the local read set and write set of the target transaction T.

4.2.4 The RM updates the local transaction status of the target transaction T to Aborted.

4.2.5 The RM returns an ACK of completing rolling-back to the coordinating node device of the target transaction T.

Optionally, after the coordinating node device of the target transaction T receives the ACK that all RM has completed rolling-back, the global transaction status is modified to Gaborted. Each RM is notified to clear the status of the target transaction T from LocalTS.

It can be seen through analysis that at the committing/rolling-back stage of the transaction T, communication mainly occurs between the coordinating node device of the target transaction T and the relevant sub RM, and the communication mainly contains the following two steps: transmit, by the coordinating node device of the target transaction T, the committing/rolling-back request message coarm to each relevant sub RM; and transmit, by each relevant sub RM, the ACK of corresponding messages of completing committing/rolling-back to the coordinating node device.

Therefore, at most 2m times of communication is performed at the committing/rolling-back stage, and the magnitude of the communication amount is m×(magnitude of the committing/rolling-back request message+magnitude of the committing/rolling-back request message), where m is the number of sub RM relevant to the transaction T.

In some embodiments, the coordinating node device transmits clearing messages to the RM in batches to reduce the number of times of communication.

All of the above optional technical solutions can be combined randomly to form optional embodiments of the present disclosure. Details are not described herein again.

In the embodiment of this disclosure, after the logical begin time and the logical end time of the transaction are initialized by utilizing the DTA technology in the TO algorithm, its logical begin time or logical end time is dynamically adjusted according to different cases, and transaction concurrent access control is performed on various consistencies of the concurrent consistency model by combining with the technologies of MVCC, DTA and OCC. An algorithm framework of OCC is mainly applied, and combined with DTA, transaction data information transmitted through the network is reduced, the validation efficiency of the distributed transactions is improved, and thus the concurrent processing capability for the distributed transactions is improved. Non-lock data reading and writing are achieved in combination with MVCC, thereby improving the concurrent processing capability of the local node.

Table 3 shows the implementation difference of the two transactions $T_1$ and $T_2$ at the serializability consistency level and stronger consistency levels, i.e., providing a DTA-based decentralization algorithm for the transaction coordinator validation stage. In the embodiment of this disclosure, a complete calculating framework for various consistencies is defined, including complete and comprehensive consistency levels, a consistency strength classifying method and a calculating environment and approach for consistency coexistence, the implementation technologies of various consistencies make a concurrent consistency model system complete and full, based on the transaction attribute definitions of Bts and Ets, expression manners of distributed consistency and transaction consistency are fused, and algorithms for distributed consistency and transaction consistency are organically unified, so that transaction theories can be migrated into the distributed system.

TABLE 3

| Concurrent level (occurring according to Real-Time) | Transaction | | | | Ordering rule in combination with DTA |
|---|---|---|---|---|---|
| | Begin | Snapshot/ read | Write operation | Committing | |
| Serialization consistency | Not overlapping | Not overlapping | Not overlapping | Not overlapping | All serialized, $T_1.ets < T_2.bts$ Values of Bts and Ets come from a global clock |
| Strict serializability | Not overlapping | Not overlapping | Not overlapping | Allow overlapping | $T_2.bts < T_1.bts < T_2.ets$ A write operation is |

TABLE 3-continued

| Concurrent level (occurring according to Real-Time) | Transaction | | | | Ordering rule in combination with DTA |
|---|---|---|---|---|---|
| | Begin | Snapshot/ read | Write operation | Committing | |
| consistency Meeting recoverability, read committed | | Read conforms to Real-Time | | Guaranteeing Real-Time | globally ordered (value of Ets comes from a global clock); in a case that $T_2$ is a read-write transaction, then $T_1$ definitely is a read-only transaction; a snapshot of one transaction, namely bts, comes from a global clock and cannot be adjusted to be larger |
| Linearizability serializability consistency | Not overlapping | Not overlapping | Allow overlapping | Allow overlapping Guaranteeing Real-Time | $T_2.bts < T_1.bts < T_2.ets$ A write operation is globally ordered (value of Ets comes from a global clock); $T_1$ is a read-write transaction, but transaction consistency validation is required; a snapshot of one transaction, namely bts, comes from a global clock and cannot be adjusted to be larger, that is, bts is non-adjustable |
| Sequential serializability consistency | Allow overlapping | Allow overlapping | Allow overlapping | Allow overlapping | $T_2.bts < T_1.bts < T_2.ets$ A write operation does not need to be globally ordered (for transactions within a session, it is guaranteed that a committing sequence is locally ordered, and although a global clock is not needed, so is guaranteed), but a conflict validation condition is to be met; a snapshot used by a read operation of a transaction cannot be less than a local logical clock of this session |
| Serializability consistency | Allow overlapping | / | / | / | Stale read may exist (the order in one transaction has naturally met the order of write of a session, but read, namely bts, may become smaller--a write concurrent transaction can only read previous data at the beginning) |

Figure 5:
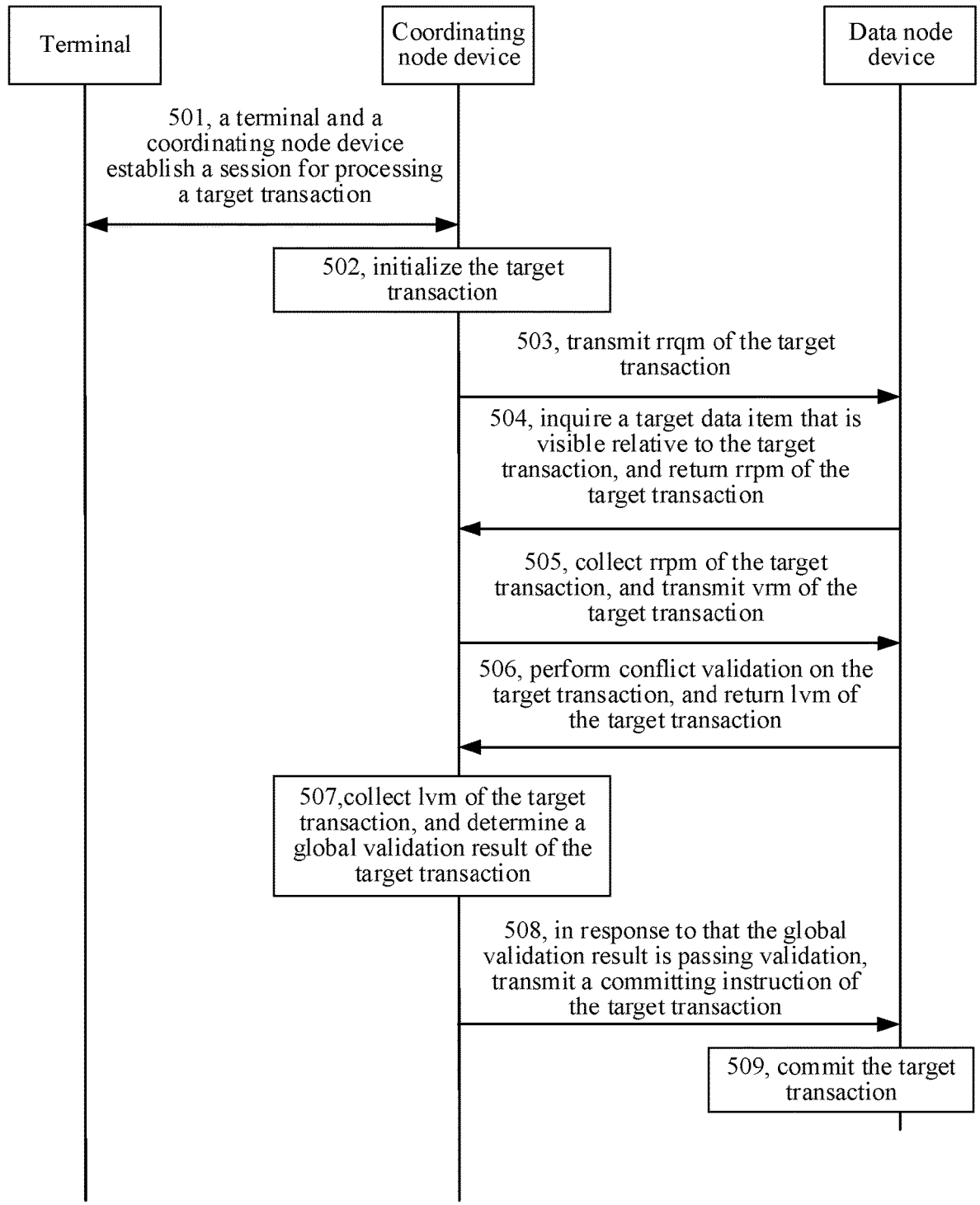
FIG. 5 is an interaction flowchart of an exemplary transaction processing method provided by an embodiment of this disclosure.

FIG. 5 is an interaction flowchart of a transaction processing method provided by an embodiment of this disclosure. Referring to FIG. 5, on the basis of the concurrent access control algorithms of the various concurrent levels above, a process of how a coordinating node device interacts with a data node device to execute a target transaction under a distributed system is provided.

In step 501, a terminal and a coordinating node device establish a session for processing a target transaction.

In step 502, the coordinating node device initializes the target transaction.

Optionally, the coordinating node device allocates a transaction identifier for the target transaction, a status of the transaction in a transaction status list is set to Grunning, T.Bts of the target transaction is initialized to 0, and T.Ets of the target transaction is initialized to +∞.

Steps 501-502 above are a snapshot stage in which the target transaction is established, which is omitted here.

In step 503, the coordinating node device transmits a data reading request message rrqm to a data node device.

Optionally, based on a request launched by an application client, the coordinating node device optimizes SQL and generates a physical execution plan of the target transaction, the execution plan is decomposed to be transmitted to data node devices involved in the target transaction respectively, the number of the data node devices is one or more, and the number of the data node devices is not specifically limited in the embodiment of this disclosure.

Optionally, the data reading request message rrqm includes 4 fields: TID (transaction identifier), Bts (logical begin time), Ets (logical end time) and ReadPlan (query plan).

In step 504, in response to the data reading request message rrqm, the data node device inquires a target data item that is visible relative to the target transaction, and returns a read request reply message rrpm of the target transaction to the coordinating node device.

Optionally, the data node device maintains information of the target transaction T to a local transaction status table LocalTS, legality validation is performed on a logical time interval [T.Bts, T.Ets], after passing validation, starting from the newest version of various to-be-read data items, the first data version with a creating time stamp less than T.Ets (i.e., the target data item) is found, T.Bts is modified according to a creating time stamp of the target data item to eliminate read-write conflicts and write-read exceptions, and the read request reply message rrpm is returned to the coordinating node device.

Steps 503-504 above are a target transaction semantics implementation operation stage, which is omitted here.

In step 505, the coordinating node device collects the read request reply message rrpm returned by the data node device and transmits a validation request message vrm of the target transaction to the data node device.

Optionally, after the coordinating node device collects various read request reply messages rrpm, whether the field IsAborts is 1 is traversed, in a case that it is 1, a global rolling-back stage is entered, otherwise, legality of the logical time interval is validated again after Bts and Ets of the target transaction are updated, the validation request message vrm (i.e., a validation instruction) is transmitted after passing validation, and a transaction validation stage is entered.

In step 506, in response to the validation request message vrm, the data node device performs conflict validation on the target transaction, and returns a local validation reply message lvm of the target transaction to the coordinating node device.

Optionally, the data node device performs legality validation on the logical time interval [T.Bts, T.Ets] of the target transaction T again, after passing validation, whether the logical time interval meets the condition of a concurrent consistency level is further validated, after passing validation, Bts of the target transaction T is updated according to a write set of the target transaction T to eliminate write-write conflicts and read-write conflicts, whether the updated logical time interval is still legal is further validated, and in a case that it is legal, the local validation reply message lvm is returned to the coordinating node device.

In step 507, the coordinating node device collects the local validation reply message lvm of the data node device to determine a global validation result of the target transaction.

Optionally, after the coordinating node device collects various local validation reply messages lvm, whether the field IsAborts is 1 is traversed, in a case that it is 1, the global rolling-back stage is entered, otherwise, legality of the logical time interval is validated again after Bts and Ets of the target transaction are updated, and after passing validation, a committing instruction is transmitted to enter a global committing stage, otherwise, a rolling-back instruction is transmitted to enter the global rolling-back stage.

Steps 505-507 above are a transaction legality validation stage, which is omitted here.

In step 508, in response to that the global validation result is passing validation, the coordinating node device transmits the committing instruction of the target transaction to the data node device.

In step 509, in response to the committing instruction, the data node device commits the target transaction.

Steps 508-509 above are a transaction committing stage, which is omitted here.

In the embodiment of this disclosure, after Bts and Ets of the target transaction are initialized by utilizing the DTA technology in the TO algorithm, its Bts or Ets is dynamically adjusted according to different cases, and transaction concurrent access control is performed on various consistencies of the concurrent consistency model by combining with the technologies of MVCC, DTA and OCC. An algorithm framework of OCC is mainly applied, and combined with DTA, transaction data information transmitted through the network is reduced, the validation efficiency of the distributed transactions is improved, and thus the concurrent processing capability for the distributed transactions is improved. Non-lock data reading and writing are achieved in combination with MVCC, thereby improving the concurrent processing capability of the local node.

Figure 6:
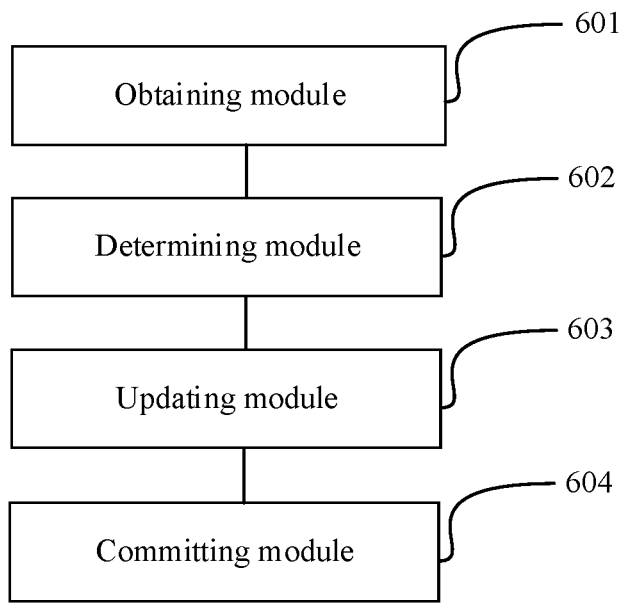
FIG. 6 is a schematic structural diagram of an exemplary transaction processing apparatus provided by an embodiment of this disclosure.

FIG. 6 is a schematic structural diagram of a transaction processing apparatus provided by an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. Referring to FIG. 6, the apparatus includes:

an obtaining module 601, configured to obtain a read set and a write set of a target transaction in response to a read-write operation of the target transaction;

a determining module 602, configured to determine a logical begin time and a logical end time of the target transaction in response to a validation instruction of the target transaction;

an updating module 603, configured to update the logical begin time based on the write set in a case that the logical begin time and the logical end time conform to a concurrent consistency level of the target transaction; and a committing module 604, configured to commit the target transaction in a case that an updated logical begin time is less than or equal to the logical end time.

According to the apparatus provided by the embodiment of this disclosure, the read and write sets of the target transaction are obtained at the executing stage of the target transaction, at the validation stage, based on the logical begin time and the logical end time of the target transaction, whether the target transaction conforms to own concurrent consistency levels is validated, and the logical begin time is dynamically updated based on predetermined policies, so that in a case that the finally updated logical begin time and the logical end time are legal, data exceptions not allowed by the own concurrent consistency levels cannot occur, and then the target transaction is committed, which can make different transactions in the whole system correspond to the different concurrent consistency levels, thereby greatly improving the data exception detection accuracy and improving the transaction processing efficiency and the performance of the database system.

In a possible implementation, based on an apparatus composition of FIG. 6, the updating module 603 includes:

an obtaining sub-module, configured to obtain to-be-written transaction information of each data item in the write set, the to-be-written transaction information being used for identifying a transaction that is modifying the data item;

an adjusting sub-module, configured to update the logical begin time in a case that each piece of to-be-written transaction information is null; and a rolling-back sub-module, configured to roll back the target transaction in a case that any piece of to-be-written transaction information is not null.

In a possible implementation, based on the apparatus composition of FIG. 6, the adjusting sub-module includes:

an obtaining unit, configured to obtain the to-be-written transaction information as a transaction identifier of the target transaction;

an updating unit, configured to update the logical begin time to make the updated logical begin time greater than a maximum read transaction time stamp of the data item, the maximum read transaction time stamp being used for representing a maximum value in logical end times of transactions that have read the data item; and an adjusting unit, configured to update the logical begin time based on an active transaction set in a case that the updated logical begin time and the logical end time conform to the concurrent consistency level of the target transaction, the active transaction set being used for identifying transactions that have started (i.e., begun to be performed) but have not been committed.

The rolling-back sub-module is further configured to roll back the target transaction in a case that the updated logical begin time and the logical end time do not conform to the concurrent consistency level of the target transaction.

In a possible implementation, the active transaction set includes a first transaction set and a second transaction set, the first transaction set is used for identifying transactions in a committing status or in a status of passing validation, and the second transaction set is used for identifying transactions in a running status. In one implementation, the first transaction set may include identifiers for identifying transactions.

The adjusting unit is configured to: update the logical begin time to make the updated logical begin time greater than a maximum logical end time among logical end times of all transactions in the first transaction set; and update logical end time of each transaction identified by the second transaction set in response to the updated logical begin time being less than or equal to the logical end time, so as to make an updated logical end time less than the updated logical begin time.

The rolling-back sub-module is further configured to roll back the target transaction in a case that the updated logical begin time is greater than the logical end time.

In a possible implementation, the rolling-back sub-module is further configured to:

roll back the transaction in a case that a logical begin time of any transaction in the second transaction set is greater than the updated logical end time.

In a possible implementation, based on the apparatus composition of FIG. 6, the apparatus further includes:

an obtaining and determining module, configured to obtain a concurrent transaction of the target transaction in a case that the concurrent consistency level is serialization consistency; obtain a newest (or latest) completed transaction time stamp of a session to which the target transaction belongs in a case that the logical end time of the target transaction is less than a logical begin time of the concurrent transaction or the logical begin time of the target transaction is greater than a logical end time of the concurrent transaction; and determine that it conforms to the concurrent consistency level in a case that the logical end time of the target transaction is greater than or equal to the newest completed transaction time stamp.

In a possible implementation, based on the apparatus composition of FIG. 6, the apparatus further includes:

an obtaining and determining module, configured to obtain a concurrent write transaction of the target transaction in a case that the concurrent consistency level is strict serializability consistency and the target transaction is a write transaction; obtain a concurrent read-only transaction of the concurrent write transaction in a case that the logical end time of the target transaction is less than a logical begin time of the concurrent write transaction or the logical begin time of the target transaction is greater than a logical end time of the concurrent write transaction; obtain a newest completed transaction time stamp of a session to which the target transaction belongs in a case that a logical begin time of the concurrent read-only transaction is greater than the logical begin time of the concurrent write transaction; and determine that it conforms to the concurrent consistency level in a case that the logical end time of the target transaction is greater than or equal to the newest completed transaction time stamp.

In a possible implementation, based on the apparatus composition of FIG. 6, the apparatus further includes:

an obtaining and determining module, configured to obtain a concurrent write transaction of the target transaction in a case that the concurrent consistency level is linearizability serializability consistency and the target transaction is a write transaction; obtain a concurrent read-only transaction of the concurrent write transaction in a case that the target transaction and the concurrent write transaction pass serializability validation; obtain a newest completed transaction time stamp of a session to which the target transaction belongs in a case that a logical begin time of the concurrent read-only transaction is greater than the logical begin time of the concurrent write transaction; and determine that it conforms to the concurrent consistency level in a case that the logical end time of the target transaction is greater than or equal to the newest completed transaction time stamp.

In a possible implementation, based on the apparatus composition of FIG. 6, the apparatus further includes:

an obtaining and determining module, configured to obtain a concurrent transaction of the target transaction in a case that the concurrent consistency level is sequential serializability consistency; determine a first transaction belonging to the same session with the target transaction in a case that the target transaction and the concurrent transaction pass serializability validation; obtain a newest completed transaction time stamp of the session in a case that the logical end time of the target transaction is less than a logical begin time of the first transaction; and determine that it conforms to the concurrent consistency level in a case that the logical end time of the target transaction is greater than or equal to the newest completed transaction time stamp. The node device updates a logical begin time of a result transaction in a causal relation in a case that the target transaction and the first transaction having a causal relationship, so as to make an updated logical begin time of the result transaction greater than a logical end time of a reason transaction. In one implementation, the reason transaction may be a triggering transaction which triggers or causes the result transaction.

In a possible implementation, based on the apparatus composition of FIG. 6, the apparatus further includes:

an obtaining and determining module, configured to obtain a concurrent transaction of the target transaction in a case that the concurrent consistency level is serializability consistency; determine a first transaction belonging to the same session with the target transaction in a case that the target transaction and the concurrent transaction pass serializability validation; and determine that it conforms to the concurrent consistency level in a case that the logical end time of the target transaction is less than a logical begin time of the first transaction and the logical begin time is less than or equal to the logical end time.

In a possible implementation, based on the apparatus composition of FIG. 6, the apparatus further includes:

an obtaining and determining module, configured to obtain a result transaction that has a causal relation with the target transaction and is caused by the target transaction in a case that the concurrent consistency level is causal repeatable read; and update a logical begin time of the result transaction to make an updated logical begin time of the result transaction greater than the logical end time of the target transaction, so as to determine that it conforms to the concurrent consistency level.

In a possible implementation, based on the apparatus composition of FIG. 6, the apparatus further includes:

an obtaining and determining module, configured to determine that it conforms to the concurrent consistency level in a case that the concurrent consistency level is repeatable read consistency, read committed consistency or read uncommitted consistency.

All of the above optional technical solutions can be combined randomly to form optional embodiments of the present disclosure. Details are not described herein again.

When the transaction processing apparatus provided in the foregoing embodiment processes a transaction, it is illustrated with an example of division of each functional module. In practical application, the function distribution may be implemented by different functional modules according to requirements, that is, an internal structure of the computer device is divided into different functional modules, to implement all or some of the functions described above. In addition, the embodiment of the transaction processing apparatus provided in the foregoing embodiment is based on the same idea as the embodiment of the transaction processing method. For the specific implementation process, refer to the transaction processing method embodiment, and the details are not described herein again.

Figure 7:
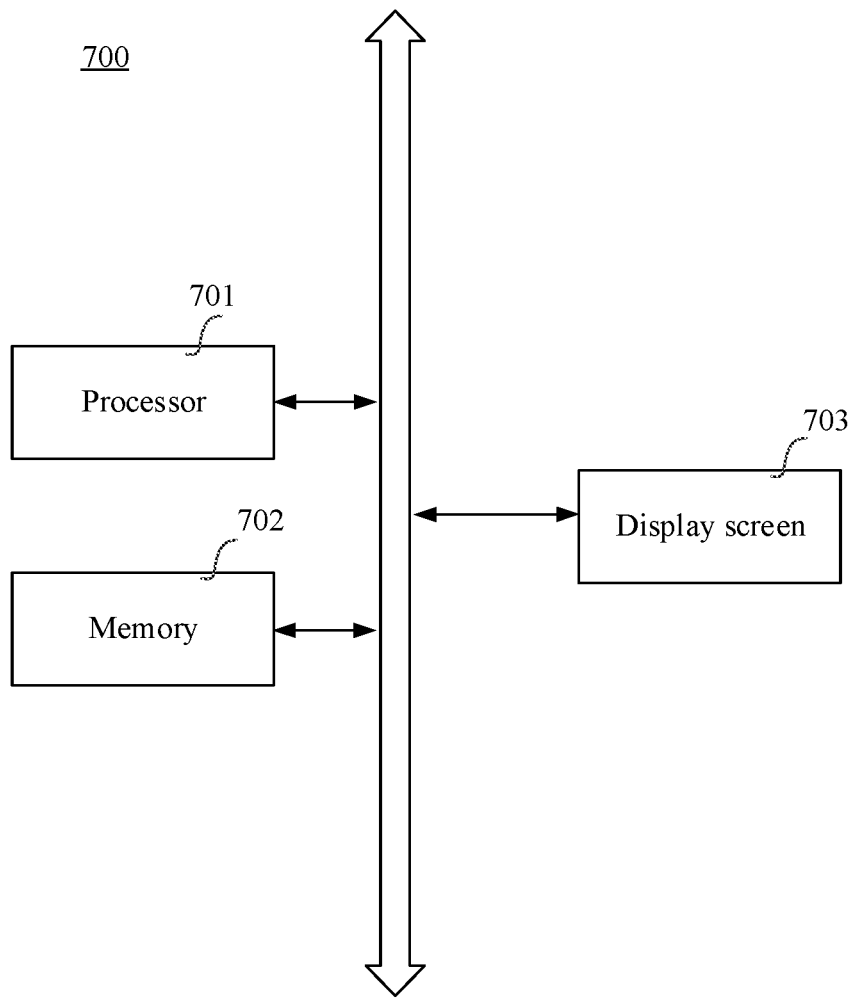
FIG. 7 is a schematic structural diagram of an exemplary computer device provided by an embodiment of this disclosure.

FIG. 7 is a schematic structural diagram of a computer device provided by an embodiment of this disclosure. Referring to FIG. 7, description is made by taking an example that the computer device is a terminal 700. Optionally, a device type of the terminal 700 includes: a smartphone, a tablet computer, a moving picture experts group audio layer III (MP3) player, a moving picture experts group audio layer IV (MP4) player, a notebook computer, or a desktop computer. The terminal 700 may also be referred to as user equipment, a portable terminal, a laptop terminal, or a desktop terminal, in other names.

Generally, the terminal 700 includes: a processor 701 and a memory 702.

Optionally, the processor 701 may include one or more processing cores, for example, may be a 4-core processor or an 8-core processor. Optionally, the processor 701 may be implemented in at least one hardware form of a digital signal processor (DSP), a field-programmable gate array (FPGA), and a programmable logic array (PLA). In some embodiments, the processor 701 includes a main processor and a coprocessor. The main processor is configured to process data in an active state, also referred to as a central processing unit (CPU). The coprocessor is a low power consumption processor configured to process data in a standby state. In some embodiments, the processor 701 is integrated with a graphic processing unit (GPU). The GPU is configured to render and plot what needs to be displayed on a display screen. In some embodiments, the processor 701 further includes an artificial intelligence (AI) processor. The AI processor is configured to process a computing operation related to machine learning.

In some embodiments, the memory 702 includes one or more non-transitory computer-readable storage media. Optionally, the non-transitory computer-readable storage medium is non-transient. Optionally, the memory 702 further includes a high-speed random access memory and a non-volatile memory, such as one or more magnetic disk storage devices or flash storage devices. In some embodiments, a non-transient computer-readable storage medium in the memory 702 is configured to store at least one piece of program code, and the at least one piece of program code is configured to be executed by the processor 701 to implement the transaction processing method provided in the embodiments of this disclosure.

In some embodiments, the terminal 700 may optionally include a display screen 703.

The display screen 703 is configured to display a user interface (UI). Optionally, the UI may include a graph, a text, an icon, a video, and any combination thereof. When the display screen 703 is a touch display screen, the display screen 703 is further capable of collecting touch signals on or above a surface of the display screen 703. The touch signal may be inputted to the processor 701 for processing as a control signal. Optionally, the display screen 703 is further configured to provide a virtual button and/or a virtual keyboard, which is also referred to as a soft button and/or a soft keyboard. In some embodiments, there is one display screen 703, disposed on a front panel of the terminal 700. In some other embodiments, there may be two display screens 703 respectively arranged on different surfaces of the terminal 700 or in a folded design. In still other embodiments, the display screen 703 is a flexible display screen arranged on a curved or folded surface of the terminal 700. Even, optionally, the display screen 703 is even set in a non-rectangular irregular pattern, namely, a special-shaped screen. Optionally, the display screen 703 is prepared by using materials such as a liquid crystal display (LCD), an organic light-emitting diode (OLED), or the like.

A person skilled in the art can understand that the structure shown in FIG. 7 does not constitute a limitation to the terminal 700, and the terminal may include more or fewer components than those shown in the figure, or some components may be combined, or a different component arrangement may be used.

Figure 8:
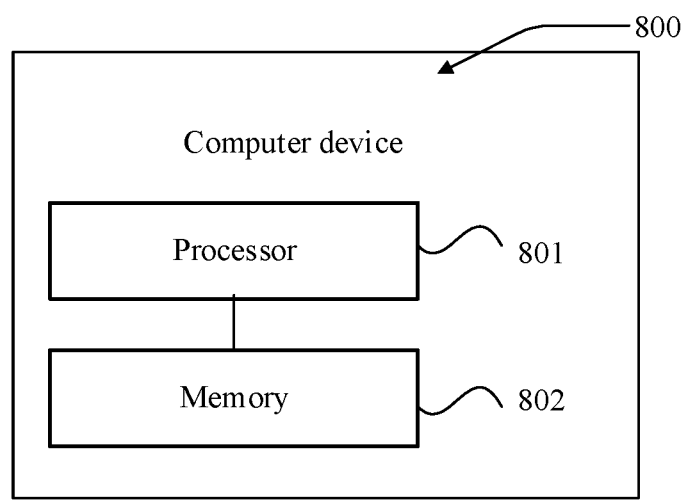
FIG. 8 is a schematic structural diagram of another exemplary computer device provided by an embodiment of this disclosure.

FIG. 8 is a schematic structural diagram of a computer device according to an embodiment of this disclosure. The computer device 800 may vary greatly due to different configurations or performance, and the computer device 800 includes one or more central processing units (CPUs) 801 and one or more memories 802. The memory 802 stores at least one piece of program code, and the at least one piece of program code is loaded and executed by the processor 801 to implement the transaction processing method provided in the foregoing embodiments. Optionally, the computer device 800 further includes components such as a wired or wireless network interface, a keyboard, and an I/O interface for ease of I/O, and the computer device 800 further includes other components for implementing functions of the device. Details are not described herein again.

In an exemplary embodiment, a non-transitory computer-readable storage medium, for example, a memory including at least one computer program is further provided. The at least one computer program may be executed by a processor in a terminal to implement the transaction processing method in the foregoing embodiments. For example, the non-transitory computer-readable storage medium includes a read-only memory (ROM), a random access memory (RAM), a compact disc read-only memory (CD-ROM), a magnetic tape, a floppy disk, an optical data storage device, or the like.

In an exemplary embodiment, a computer program product or a computer program is further provided, including one or more pieces of program code, the one or more pieces of program code being stored in a non-transitory computer-readable storage medium. One or more processors of a computer device can read the one or more pieces of program code from the non-transitory computer-readable storage medium, and the one or more processors execute the one or more pieces of program code to enable the computer device to perform the transaction processing method in the foregoing embodiments.

A person of ordinary skill in the art may understand that all or some of the steps of the foregoing embodiments may be implemented by hardware or may be implemented by a program instructing relevant hardware. Optionally, the program is stored in a non-transitory computer-readable storage medium. Optionally, the non-transitory storage medium mentioned above is a ROM, a magnetic disk, an optical disc, or the like.

The foregoing descriptions are merely optional embodiments of this disclosure, but are not intended to limit this application. Any modification, equivalent replacement, or improvement made within the spirit and principle of this application shall fall within the protection scope of this application.

What is claimed is:

1. A method for transaction processing, performed by a computer device, the method comprising:
   obtaining a read set and a write set of a target transaction in response to a read-write operation of the target transaction;
   determining a logical begin time and a logical end time of the target transaction in response to a validation instruction of the target transaction;
   in response to the logical begin time and the logical end time conforming to a concurrent consistency level of the target transaction, to obtain an updated logical begin time:
      obtaining to-be-written transaction information of a data item in the write set, the to-be-written transaction information being used for identifying a transaction that is modifying the data item;
      in response to each piece of the to-be-written transaction information being null:
         using the to-be-written transaction information as a transaction identifier of the target transaction;
         updating the logical begin time to make the updated logical begin time greater than a maximum read transaction time stamp of the data item, the maximum read transaction time stamp representing a maximum value in logical end times of transactions that have read the data item;
      adjusting the logical begin time based on an active transaction set in response to the updated logical begin time and the logical end time conforming to the concurrent consistency level of the target transaction, the active transaction set identifying transactions that have started but have not been committed; and
      rolling back the target transaction in response to the updated logical begin time and the logical end time not conforming to the concurrent consistency level of the target transaction; and
   rolling back the target transaction in response to any piece of the to-be-written transaction information being not null; and
   committing the target transaction in response to the updated logical begin time being less than or equal to the logical end time.

2. The method according to claim 1, wherein:
   the active transaction set comprises a first transaction set and a second transaction set, the first transaction set identifying transactions in a committing status or in a passing-validation status, and the second transaction set identifying transactions in a running status; and
   adjusting the logical begin time comprises:
   updating the logical begin time to make the updated logical begin time greater than a maximum logical end time among logical end times of all transactions in the first transaction set;
   updating logical end time of each transaction identified by the second transaction set in response to the updated logical begin time being less than or equal to the logical end time, to make the logical end time of the each transaction being less than the updated logical begin time; and
   rolling back the target transaction in response to the updated logical begin time being greater than the logical end time.

3. The method according to claim 2, further comprising:
   rolling back a transaction in the second transaction set in response to a logical begin time of the transaction being greater than the updated logical end time.

4. The method according to claim 1, further comprising:
   obtaining a concurrent transaction of the target transaction in response to the concurrent consistency level being serialization consistency;
   obtaining a latest completed transaction time stamp of a session to which the target transaction belongs in response to the logical end time of the target transaction being less than a logical begin time of the concurrent transaction or the logical begin time of the target transaction being greater than a logical end time of the concurrent transaction; and
   determining that the target transaction conforms to the concurrent consistency level in response to the logical end time of the target transaction being greater than or equal to the latest completed transaction time stamp.

5. The method according to claim 1, further comprising:
   obtaining a concurrent write transaction of the target transaction in response to the concurrent consistency level is strict serializability consistency and the target transaction is a write transaction;
   obtaining a concurrent read-only transaction of the concurrent write transaction in response to the logical end time of the target transaction being less than a logical begin time of the concurrent write transaction or the logical begin time of the target transaction being greater than a logical end time of the concurrent write transaction;

obtaining a latest completed transaction time stamp of a session to which the target transaction belongs in response to a logical begin time of the concurrent read-only transaction being greater than the logical begin time of the concurrent write transaction; and determining that the target transaction conforms to the concurrent consistency level in a case that the logical end time of the target transaction is greater than or equal to the latest completed transaction time stamp.

6. The method according to claim 1, wherein the method further comprises:

obtaining a concurrent write transaction of the target transaction in response to the concurrent consistency level being linearizability serializability consistency and the target transaction being a write transaction;

obtaining a concurrent read-only transaction of the concurrent write transaction in response to the target transaction and the concurrent write transaction passing serializability validation;

obtaining a latest completed transaction time stamp of a session to which the target transaction belongs in response to a logical begin time of the concurrent read-only transaction being greater than the logical begin time of the concurrent write transaction; and determining that the target transaction conforms to the concurrent consistency level in response to the logical end time of the target transaction being greater than or equal to the latest completed transaction time stamp.

7. The method according to claim 1, further comprising:

obtaining a concurrent transaction of the target transaction in response to the concurrent consistency level being sequential serializability consistency;

determining a first transaction belonging to a same session with the target transaction in response to the target transaction and the concurrent transaction passing serializability validation;

obtaining a latest completed transaction time stamp of the session in response to the logical end time of the target transaction being less than a logical begin time of the first transaction;

determining that the target transaction conforms to the concurrent consistency level in response to the logical end time of the target transaction being greater than or equal to the newest completed transaction time stamp; and in response to the target transaction and the first transaction having a causal relationship, updating a logical begin time of a result transaction in the causal relationship, such that an updated logical begin time of the result transaction is greater than a logical end time of a reason transaction in the causal relationship.

8. The method according to claim 1, further comprising:

obtaining a concurrent transaction of the target transaction in response to the concurrent consistency level is serializability consistency;

determining a first transaction belonging to a same session with the target transaction in response to the target transaction and the concurrent transaction pass serializability validation; and determining that it conforms to the concurrent consistency level in response to the logical end time of the target transaction is less than a logical begin time of the first transaction and the logical begin time is less than or equal to the logical end time.

9. The method according to claim 1, further comprising:

obtaining a result transaction having a causal relationship with the target transaction and caused by the target transaction in response to the concurrent consistency level is causal repeatable read consistency; and updating a logical begin time of the result transaction to make an updated logical begin time of the result transaction greater than the logical end time of the target transaction, to make the target transaction conform to the concurrent consistency level.

10. The method according to claim 1, further comprising:

determining that the target transaction conforms to the concurrent consistency level in response to the concurrent consistency level being one of repeatable read consistency, read committed consistency, or read uncommitted consistency.

11. A device for transaction processing, the device comprising a memory for storing computer instructions and a processor in communication with the memory, wherein, when the processor executes the computer instructions, the processor is configured to cause the device to:

obtain a read set and a write set of a target transaction in response to a read-write operation of the target transaction;

determine a logical begin time and a logical end time of the target transaction in response to a validation instruction of the target transaction;

in response to the logical begin time and the logical end time conforming to a concurrent consistency level of the target transaction, to obtain an updated logical begin time:

obtain to-be-written transaction information of a data item in the write set, the to-be-written transaction information being used for identifying a transaction that is modifying the data item;

in response to each piece of the to-be-written transaction information being null:

use the to-be-written transaction information as a transaction identifier of the target transaction;

update the logical begin time to make the updated logical begin time greater than a maximum read transaction time stamp of the data item, the maximum read transaction time stamp representing a maximum value in logical end times of transactions that have read the data item;

adjust the logical begin time based on an active transaction set in response to the updated logical begin time and the logical end time conforming to the concurrent consistency level of the target transaction, the active transaction set identifying transactions that have started but have not been committed; and roll back the target transaction in response to the updated logical begin time and the logical end time not conforming to the concurrent consistency level of the target transaction; and roll back the target transaction in response to any piece of the to-be-written transaction information being not null; and commit the target transaction in response to the updated logical begin time being less than or equal to the logical end time.

12. The device according to claim 11, wherein:

the active transaction set comprises a first transaction set and a second transaction set, the first transaction set identifying transactions in a committing status or in a passing-validation status, and the second transaction set identifying transactions in a running status; and when the processor is configured to cause the device to adjust the logical begin time, the processor is configured to cause the device to:

update the logical begin time to make the updated logical begin time greater than a maximum logical end time among logical end times of all transactions in the first transaction set;

update logical end time of each transaction identified by the second transaction set in response to the updated logical begin time being less than or equal to the logical end time, to make the logical end time of the each transaction being less than the updated logical begin time; and roll back the target transaction in response to the updated logical begin time being greater than the logical end time.

13. The device according to claim 12, wherein, when the processor executes the computer instructions, the processor is configured to further cause the device to:

roll back a transaction in the second transaction set in response to a logical begin time of the transaction being greater than the updated logical end time.

14. A non-transitory storage medium for storing computer readable instructions, the computer readable instructions, when executed by a processor, causing the processor to:

obtain a read set and a write set of a target transaction in response to a read-write operation of the target transaction;

determine a logical begin time and a logical end time of the target transaction in response to a validation instruction of the target transaction;

in response to the logical begin time and the logical end time conforming to a concurrent consistency level of the target transaction, to obtain an updated logical begin time:

obtain to-be-written transaction information of a data item in the write set, the to-be-written transaction information being used for identifying a transaction that is modifying the data item;

in response to each piece of the to-be-written transaction information being null:

use the to-be-written transaction information as a transaction identifier of the target transaction;

update the logical begin time to make the updated logical begin time greater than a maximum read transaction time stamp of the data item, the maximum read transaction time stamp representing a maximum value in logical end times of transactions that have read the data item;

adjust the logical begin time based on an active transaction set in response to the updated logical begin time and the logical end time conforming to the concurrent consistency level of the target transaction, the active transaction set identifying transactions that have started but have not been committed; and roll back the target transaction in response to the updated logical begin time and the logical end time not conforming to the concurrent consistency level of the target transaction; and roll back the target transaction in response to any piece of the to-be-written transaction information being not null; and commit the target transaction in response to the updated logical begin time being less than or equal to the logical end time.

* * * * *